US011941601B2

(12) United States Patent
Cummins et al.

(10) Patent No.: US 11,941,601 B2
(45) Date of Patent: Mar. 26, 2024

(54) SYSTEM AND METHOD OF NEAR FIELD COMMUNICATION CONTROL FOR VENDING MACHINES

(71) Applicant: The Coca-Cola Company, Atlanta, GA (US)

(72) Inventors: Jeffrey Cummins, Atlanta, GA (US); Jason Aurelia, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 256 days.

(21) Appl. No.: 17/360,631

(22) Filed: Jun. 28, 2021

(65) Prior Publication Data
US 2021/0406860 A1   Dec. 30, 2021

Related U.S. Application Data

(60) Provisional application No. 63/045,168, filed on Jun. 28, 2020.

(51) Int. Cl.
| | |
|---|---|
| *G06Q 20/20* | (2012.01) |
| *G06F 16/901* | (2019.01) |
| *G06Q 20/02* | (2012.01) |
| *G06Q 20/18* | (2012.01) |
| *G06Q 20/32* | (2012.01) |
| *G06Q 20/38* | (2012.01) |
| *H04L 9/08* | (2006.01) |

(52) U.S. Cl.
CPC ......... *G06Q 20/204* (2013.01); *G06F 16/901* (2019.01); *G06Q 20/027* (2013.01); *G06Q 20/18* (2013.01); *G06Q 20/202* (2013.01); *G06Q 20/3278* (2013.01); *G06Q 20/3829* (2013.01); *H04L 9/0894* (2013.01)

(58) Field of Classification Search
CPC .... G06Q 20/204; G06Q 20/027; G06Q 20/18; G06Q 20/202; G06Q 20/3278; G06Q 20/3829; G06F 16/901; H04L 9/0894
See application file for complete search history.

(56) References Cited

U.S. PATENT DOCUMENTS

| | | | |
|---|---|---|---|
| 8,645,273 B2 | 2/2014 | Antao et al. | |
| 8,875,994 B2 | 11/2014 | Theobald | |
| 10,163,292 B1 * | 12/2018 | Romero | G07F 9/026 |
| 2009/0216665 A1 | 8/2009 | Merwarth et al. | |

(Continued)

*Primary Examiner* — A. Hunter Wilder
*Assistant Examiner* — Joseph M Mutschler
(74) *Attorney, Agent, or Firm* — Meunier Carlin & Curfman LLC

(57) ABSTRACT

A near field communications vending control file is a non-transitory computer readable medium (CRM) for configuring a near field communication vending machine. Typically, a control file will be stored in computerized memory on a computer on a network connected to vending machines as described herein. The control file may be configured with at least one universal configuration template organizing vending parameters in a pattern of software commands, wherein the vending parameters are selected to complete an interface protocol that enables the NFC vending machine to accept a request by a customer payment device. The vending parameters enable the NFC vending machine to consummate a vending transaction initiated by an NFC tap from a customer payment device (i.e., a transaction type device).

15 Claims, 21 Drawing Sheets

(56) References Cited

U.S. PATENT DOCUMENTS

| | | |
|---|---|---|
| 2009/0216675 A1 | 8/2009 | Antao et al. |
| 2013/0290087 A1 | 10/2013 | Merwarth et al. |
| 2014/0149267 A1 | 5/2014 | Antao et al. |
| 2014/0358791 A1 | 12/2014 | Antao et al. |
| 2018/0276674 A1* | 9/2018 | Ramatchandirane .. G06Q 20/18 |
| 2019/0158353 A1* | 5/2019 | Johnson ................. G06F 16/95 |
| 2019/0172055 A1 | 6/2019 | Hale et al. |
| 2020/0178055 A1* | 6/2020 | Suzuki ................. H04W 8/245 |

* cited by examiner

1000

1100

Example Definition of all CAI Values

```
    "School Name" : "University of Alabama",
    "Notes" : "",
    "Enable" : "Blackboard DESfire and Blackboard Mobile
Credential",
    "OEMS" : [
      {
        "OEM" : "MEI"
      },
      {
        "OEM" : "CAI",
        "Version" : "0.01.00",
        "ClassicCfg" : [
        ],
        "DesfireCfg" : [
          {
            "Type" : "BbMobile",
            "DetAID" : "BBBBB0",
            "DetKey" : "22222222222222222222222222222223",
            "AppAID" : "BBBBB3",
            "KeyNum" : 1,
            "Key" : "7B9373D5DC49C59859F69424C2CBF1A3",
            "AuthAlg" : "AES",
            "DiverseAlg" : "BLACKBOARD",
            "Mode" : "ASCII",
            "FileID" : 1,
            "ReadSize" : 48,
            "Offset" : 0,
            "AuthMode" : "Native",
            "CommMode" : "Plain"
          },
          {
            "Type" : "Std",
            "DetAID" : "",
            "DetKey" : "",
            "AppAID" : "BBBBB3",
            "KeyNum" : 1,
            "Key" : "7B9373D5DC49C59859F69424C2CBF1A3",
            "AuthAlg" : "AES",
            "DiverseAlg" : "None",
            "Mode" : "ASCII",
            "FileID" : 1,
            "ReadSize" : 48,
            "Offset" : 0,
            "AuthMode" : "Native",
            "CommMode" : "Plain"
          }
        ]
      }
    ]
}
```

3405 (brace pointing to the "BbMobile" block)

FIG. 21

Definition of all MEI Values Please list out all possibilities

```
{
  "School Name" : "University of Camden",
  "Notes" : "",
  "Enable" : "TouchNet Mifare/DESfire and Blackboard ECP2.0",
  "OEMS" : [
    {
      "OEM" : "CTC",
      "Version" : "0.01.00",
      "ClassicCfg" : [
        {
          "Type" : "1K",
          "Mode" : "ASCII",
          "ReadSize" : 16,
          "Offset" : 0,
          "Sector" : 3,
          "Key" : "F4EF6D08942F"
        }
      ],
      "DesfireCfg" : [
        {
          "Type" : "BbMobile",
          "DetAID" : "BBBBB0",
          "DetKey" : "01BE102F1F0ECBF3BE15FA92E7561409",
          "AppAID" : "BBBBB3",
          "KeyNum" : 0,
          "Key" : "4AD77B5E8663BB1B0C6E17183D044E16",
          "AuthAlg" : "AES",
          "DiverseAlg" : "BLACKBOARD",
          "Mode" : "ASCII",
          "FileID" : 1,
          "ReadSize" : 28,
          "Offset" : 0,
          "AuthMode" : "Native",
          "CommMode" : "Plain"
        },
        {
          "Type" : "Std",
          "DetAID" : "",
          "DetKey" : "",
          "AppAID" : "F07A30",
          "KeyNum" : 4,
          "Key" : "11111100000000000000000000000000",
          "AuthAlg" : "AES",
          "DiverseAlg" : "TouchNet",
          "Mode" : "ASCII",
          "FileID" : 0,
          "ReadSize" : 25,
          "Offset" : 0,
          "AuthMode" : "Native",
          "CommMode" : "Plain"
        }
      ]
    }
  ]
}
```

3505 (bracket indicating the "OEM": "CTC" ClassicCfg block)

FIG. 22

Definition of all MEI Values Please list out all possibilities

```
"Type" : "??", Examples
"Mode" : "ASCII", Examples
```

FIG. 23

SYSTEM AND METHOD OF NEAR FIELD COMMUNICATION CONTROL FOR VENDING MACHINES

CROSS-REFERENCE TO RELATED APPLICATIONS

This application claims priority to and incorporates entirely by reference the disclosure of U.S. Provisional Patent Application Ser. No. 63/045,168, filed on Jun. 28, 2020, and entitled "System and Method of Near Field Communication Control for Vending Machines."

BACKGROUND

In the vending industry, coins and bills have been one manner used to pay for vended goods and services. In this regard, when a vending account is to be settled, coins and bills can be collected from vending equipment, and the coins and bills can be reconciled with the physical inventory to determine what was sold and how much money was collected.

In recent years, cashless payments, for example credit cards and near field communications cards, have become an option for payments. In this regard, a user of vending equipment may now be able to use cashless payments, in addition to coin and bill payments, for vended goods and services. In the case of cashless payments, a cashless payment can typically be processed by a third party server. Subsequently, an electronic funds transfer (EFT) can remit the cashless payment received, less any transaction processing fees and/or other fees, to an operator of the vending equipment. Even so, in some instances, the EFT may not reconcile an actual vend event with an associated actual cashless transaction. To further complicate matters, the vend sale amount may not match the EFT amount since fees may be deducted from the cashless funds, and oftentimes, the EFT transactions may represent an aggregated batch or bundling of multiple transactions, thus obscuring each individual vend transaction.

The processing of cashless transactions can cause numerous problems for processors handling cashless transactions, vendors offering goods and/or services by way of a vending machine accepting cashless transactions, and others involved in the cashless transaction process. For example, in one settlement process, coins, bills, and cashless transactions may not be timely reconciled with inventory since many cashless transactions may still be stored in a vending machine or other associated data storage device. In other instances, cashless transactions may still be en route to a third party server, not settled yet and/or aggregated with little or no transaction level detail. Oftentimes, only after vend settlement is initiated, may an associated EFT transaction occur, which can further frustrate the settlement process because of the aggregated nature of EFTs.

In addition, the routing of cashless transactions to one or more third party servers can also create an accountability problem. In some instances, multiple items can be vended from a vending machine, and one or more customers may attempt to pay with a cashless implement, such as a credit or debit card. However, in such instances, there is no guarantee that a vending equipment operator will ever see funds for vends paid for by cashless transactions, and no further guarantee that a customer was correctly charged for the vended goods and/or services. As such, there may be little or no accountability as to when vends occurred or what was charged to the customer. Moreover, there may be little or no accountability as to whether a customer was timely and accurately charged, and little or no assurance that a vending equipment operator timely received the correct funds for vends paid for by cashless transactions.

Furthermore, a problem exists in auditing third party servers to verify accuracy and/or correctness of cashless transactions. In this regard, cashless transaction vending can lack oversight, accountability, auditing controls, and the ability to control how a device in the vending equipment operates and how data is communicated with or between various servers or other data processing devices.

Another problem occurs when route personnel attempt to reconcile transaction amounts and inventory at a vending equipment location. In some instances, the amount of bills, coins, cashless vends, and inventory must be known at the same point in time. As related to cashless transactions, this means knowing what the value of each transaction is without any fees removed, knowing which of the cashless transactions have been settled, and also knowing which of the settled cashless transactions have a corresponding EFT record indicating that an operator of the vending equipment has been paid for the cashless transactions. Without this level of detail, it may be unlikely that an accurate or timely vending equipment settlement can be performed without error across multiple vending equipment locations. For vending equipment in global locations, the settlement process may not be performed efficiently.

The vending industry has been focusing more and more upon cashless transactions and one technology that has been at the forefront of development is that of near field communication (NFC) vending. One global resource for NFC development is the NFC Forum. The NFC Forum is a non-profit industry association whose membership draws from all parts of the NFC ecosystem. Working within the framework of the NFC Forum, member organizations share development, application, and marketing expertise to develop the best possible solutions for advancing the use of Near Field Communication (NFC) technology which enables the lives of consumers worldwide and advances members' business objectives. As explained at https://nfc-forum.org/what-is-nfc/, Near Field Communication (NFC) is a contact-less communication technology based on a radio frequency (RF) field using a base frequency of 13.56 MHz. NFC technology is perfectly designed to exchange data between two devices through a simple touch gesture.

The RF field generated by an NFC Forum Device to communicate with an NFC Forum Tag has numerous tasks:
1. To transfer power from the NFC Forum Device to the NFC Forum Tag. Therefore the NFC Forum Tags do not need batteries or other power supplies for operation as the necessary power for communication is provided by the RF field.
2. For Wireless Charging the primary goal of NFC Technology is to transfer power thus extending communication. In this case NFC communication is used to regulate the power transfer. When Wireless Charging mode is active the field strength of the RF field can be increased allowing a power transfer of up to 1 W.
3. The NFC device is sending information to an NFC Forum Tag by modulating the RF field signal (signal modulation). The NFC device is receiving information from an NFC Forum Tag by sensing the modulation of the load generated by the NFC Forum tag (load modulation).

As the NFC Forum further explains on its website, NFC technology is designed for an operation distance of a few centimeters, and this makes it more difficult for attackers to record the communication between an NFC Forum Device and an NFC Forum Tag compared to other wireless technologies which have a working distance of several meters. In addition, the user of the NFC Forum Device determines by the touch gesture which entity the NFC communication should take place, which makes it more difficult for the attacker to get connected. As a result, the security level of the NFC communication is by default higher compared to other wireless communication protocols. Additionally, the NFC Forum has added Peer to Peer communication which is a mechanism to cipher all exchanged data to avoid that a spy can interpret recorded communication.

In an NFC network, a customer device, such as an NFC enabled card or even an NFC enabled smart phone/smart device, is equipped to consummate communications according to NFC protocols. In one prior embodiment, described in U.S. Patent Pub. No. 20190172055, the NFC protocols may be used to consummate vending transactions. In this set up, a payment network is used to verify purchase activity on the associated card's debit account to access media and to credit funds to the card's associated prepaid account. NFC technology is one option of communicating back to the issuer that prompted the cardholder to verify the card. This publication speaks to use in authentication of the card and is looking to validate a physical card in the possession of the named card holder and not using a card as a key for access, for example.

The '055 publication describes that a payment card or customer device may be made from rigid plastic, PVC, PET, styrene, polypropylene, Tyvek®, or other synthetic material, conforming to ISO 7810 ID-Type 1 form factor, with an embedded passive High Frequency (HF) NFC chip that supports NFC Data Exchange Format (NDEF) encoding. The card or item has an assigned identifier, e.g., an account number, e.g., a credit, debit, or prepaid debit account number, and is capable of being used for payment of goods or services with the account number, which can be imaged on a surface of the card or item using inkjet, thermal transfer, laser, or other commercially available variable imaging processes.

The embedded HF NFC payment chip is preferably linked to the card's or item's identifier or account number in a remotely hosted database with an association being made to the card's or item's Unique Identification Number (UID), or another unique identifying element encoded into the chip's memory. The UID can be the same as the card or item identifier or account number or a different unique identifying element in the chip's memory. The embedded HF NFC chip, encoded using NFC Data Exchange Format (NDEF), is encoded to deliver an executable code that directs an NFC enabled reader to extract information form the card that contains content restricted from general audiences and is only accessible by the reader in the presence of the card or item designated by the issuer to have access.

Therefore, a need exists for systems and methods for providing a vending network that takes advantage of NFC communications. One problem addressed in this disclosure is that of setting up and configuring numerous vending machines on the vending network to accept the above mentioned customer devices, i.e., an NFC enabled card or tag device. Vending machines are particularly prominent in the food industry for snacks and drinks on campuses for business, government agencies, and educational institutions. Original equipment manufacturers (OEMs) provide services and inventory to respective vending machines across these worldwide campus locations.

One particular need in the vending industry is that of configuring payment protocols at individual vending machines all over the world. In past practices, each vending machine at each business location had to be individually configured by personnel going to the vending machine to accept payment protocols, such as near field communication devices. As discussed below, the OEM vending machines often include payment bezels that have corresponding readers for payment. The readers may be numerous kinds of cash and cashless payment readers, but of particular interest are readers for NFC payment transactions. Configuring these readers individually by manually uploading configuration parameters to the vending machine payment bezel is time consuming, especially when the vending machines originate from different manufacturers and use different protocols.

A need continues to exist in the art of cashless vending for a configuration protocol that can be conducted remotely without requiring personnel to be physically present at the vending machine.

SUMMARY

In one embodiment, a control file may be described as a non-transitory computer readable medium (CRM) for configuring a near field communication ("NFC") vending machine. Typically, a control file will be stored in computerized memory on a computer on a network connected to vending machines as described herein. The control file may be configured with at least one universal configuration template organizing vending parameters in a pattern of software commands, wherein the vending parameters are selected to complete an interface protocol that enables an NFC vending machine to accept a request by a customer payment device. The vending parameters enable the NFC vending machine to consummate a vending transaction initiated by an NFC tap from a customer payment device (i.e., a transaction type device).

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 21 is an example section of a control file according to this disclosure.

FIG. 22 is an example section of a control file according to this disclosure.

FIG. 23 is an example section of a control file according to this disclosure.

DETAILED DESCRIPTION

Figure 1:
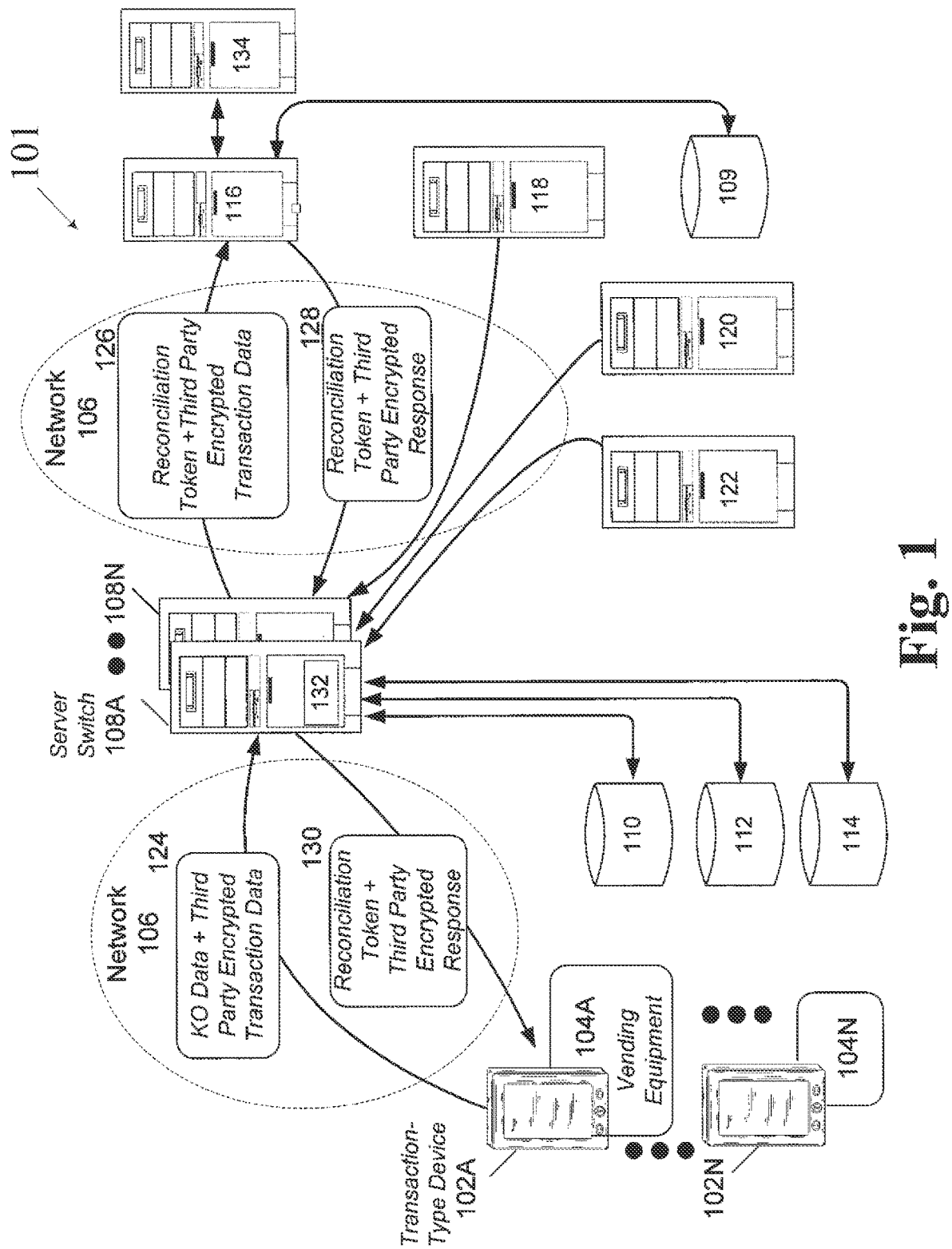
FIG. 1 illustrates an example electronic transaction auditing and accountability system in accordance with an embodiment of the disclosure.

As used herein, the term "transaction" can refer to a cash or cashless payment associated with a purchase of a good and/or service. Embodiments of the disclosure are intended to cover any combination of cash and/or cashless payments or transactions as well as payments or transactions relating to any combination of goods and/or services.

As used herein, the terms "server switch" and "server" can be used interchangeably. Embodiments of the disclosure are intended to cover any combination of servers, server switches, or other processing devices with similar functionality to a server or server switch.

As used herein, the terms "reconciliation token" and "unique identifier" can be used interchangeably. Embodiments of the disclosure are intended to cover any type of unique identifier including, but not limited to, a reconciliation token or any other device, code, or identifying instrument with similar functionality.

Embodiments of the disclosure are intended to cover any combination of servers, server switches, or other processing devices with similar functionality to a server or server switch. As used herein, the terms "reconciliation token" and "unique identifier" can be used interchangeably. Embodiments of the disclosure are intended to cover any type of unique identifier including, but not limited to, a reconciliation token or any other device, code, or identifying instrument with similar functionality. The following terms are provided as context to the NFC environment of cashless transactions enabled herein.

TABLE 1

| Term | Description |
| --- | --- |
| aptiQ | An assigned number during the manufacturing process for the card reader device. The serial number is unique per OEM. |
| Bottler | A group that that loads and services cashless vending machines. |
| Business Location | A collection of outlets at one location. An example would be 10 vending machines may be in front of one store location. |
| Credit To Number | A reference number assigned to an outlet for reporting purposes. This is used to look up an outlet in other systems besides the gateway. |
| DesFire EV1 | New evolution of MIFARE DesFire card, broadly backwards compatible. Available with 2 KB, 4 KB and 8 KB NV-Memory. Other features include: Support for random ID Support for 128-bit AES (previously called DESFire8) |
| Device | A Cashless reader terminal. |
| Gateway | Payment Gateway that process credit card and driver fill transactions from the vending machine. |
| HID iClass | HID iClass; 13.56 MHz, partially ISO 15693 or 14443-B Writeable, electronic purse function, multiple applications (3)DES security Many Versions to support |
| JS on Message Structure | JSon Message Structure is a format that uses readable text to transmit data objects consisting of attributing value pairs. It is the most common data format used for asynchronous browser/server communication, largely replacing XML. |
| MiFare Classic | The MIFARE Classic card is fundamentally just a memory storage device, where the memory is divided into segments and blocks with simple security mechanisms for access control. They are Application specific based and have limited computational power. Thanks to their reliability and low cost, those cards are widely used for electronic wallet, access control, corporate ID cards, transportation or stadium ticketing. |

TABLE 1-continued

| Term | Description |
| --- | --- |
| Model Number | A value number assigned by the manufacturer. In example RDP for a MEI device and |
| Name Extension | A reference name assigned to an outlet for reporting purposes. This is used to look up an outlet in other systems besides the gateway. |
| OEM | Original Equipment Manufacturer An example would be MEI also sometimes referred to as "Make" |
| Outlet | A single cashless device is equal to a Terminal ID (outlet). The Terminal ID will be tied to a Card Acceptor ID (profit center number) for managing terminals (outlets). An outlet is linked to a Card Acceptor ID (Profit Center Number and Sales Center Name) in the he gateway. |
| Segment | A reference name assigned to an outlet for reporting purposes. This is used to look up an outlet in other systems besides the gateway. An example would be "College/University" or "Amusement/Theme Park" |
| Web Services | Defined by the W3C as "a software system designed to support interoperable machine-to-machine interaction over a network" |

Referring now to FIG. 1, an example of a system such as a vending network system 100 in accordance with an embodiment of the disclosure is shown. Embodiments of the disclosure can provide systems and methods for providing a vending network. Other embodiments of a vending network are shown in FIGS. 1-6. In general, embodiments of the disclosure can use one or more reconciliation tokens to track or otherwise mark any number of transactions handled by the vending network system 100 during communications between at least one server switch and one or more third party servers and/or a settlement engines.

In the embodiment shown in FIG. 1, a vending network system 100 can include one or more transaction devices 102A-N associated with respective vending equipment 104A-N. Some or all of the transaction-type devices 102A-N can be in communication via at least one network, such as 106, with one or more server switches, such as 10A-N. In one embodiment, one or more transaction-type devices 102A-N can be in communication with each other via one or more networks, such as 106.

Transaction-type devices 102A-N can be any processor-type device, and may be referred to individually as a data processing device. Some or all transaction-type devices 102A-N can be operable to receive and transmit data associated with at least one cash and/or cashless transaction, or a consumer. Such data may be referred to as transaction data. Transaction data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and any other type of data associated with a vending equipment transaction or a consumer. Examples of transaction-type devices can include, but are not limited to, a cash transaction reader, a cashless transaction reader, a combination cash and cashless transaction reader, a RFID reader, a biometric reader, an energy management system (EMS)-type device, a vending machine controller (VMC), and any other type of payment transaction devices. In some instances, a transaction device can be manufactured by HP™, DELL™, IBM/LENOVO™, and GATEWAY™, and may operate software provided by MICROSOFT™, and LINUX™.

In one embodiment, a transaction-type device, such as 102A, can be a payment device operable to accept a cash and/or cashless payment from a consumer, and further operable to facilitate the dispensing of goods and/or services from associated vending equipment, such as 104A. In another embodiment, a transaction-type device, such as 102A, can be a vending equipment controller operable to facilitate the operation of associated vending equipment, such as 104A.

Vending equipment 104A-N can include, but is not limited to, a product or beverage dispenser, a vending machine, a snack dispenser, a device capable of dispensing or providing a consumable food or drink item, a device capable of dispensing or providing a non-consumable item, or a device capable of facilitating purchase of a good and/or service. Vending equipment, such as 104A, can also be referred to individually as a vending machine. In some embodiments, vending equipment 104A-N may conform to vending industry standards including, but not limited to, the National Automatic Merchandising Association (NAMA) MDB specification, and the European Vending Association (EVA) DEX specification. In one embodiment, vending equipment 104A-N can include a vending industry standard-type multi-drop-bus (MDB) interface, and/or a data exchange (DEX) interface.

In one embodiment, multi-drop-bus (MDB) data can be collected from vending equipment, such as 104A-N, and the collected MDB data used to form transaction data records. In this regard, MDB data can include, but is not limited to, inventory, product pricing, and other data during vend events that can be combined with payment ID (for example a PIN number or credit card number) to form a transaction record. In addition, MDB data can be collected during non-vend events and used to form transaction records such as service requests, energy management records, and other types of transaction records.

In the embodiment shown in FIG. 1, a network 106 can be wired or wireless-type network, and may be more than one network to facilitate both wired and wireless-type communications between system components. The network 106 shown in FIG. 1 is shown by way of example Examples of a network 106 can include, but are not limited to, a local area network (LAN), a wide area network (WAN), the Internet, a global network, a wireless network, a wired network, and any combination thereof. Wireless network communications can be implemented, for example, by way of GSM, GPRS, CDMA2000, 1×RTT, EDGE, 802.11 types and kinds including but not limited to a, b, g, n, 900 MHz, 2.4 GHz, 5 GHz, spread spectrum, open wireless standards, proprietary wireless techniques, 3G, 3.5G, 4G technologies ('G' stands for generation), and any other wireless-type communication device, standard, or methodology. Wired network communications can be implemented, for example, by way of Ethernet, Firewire, serial communications, USB, RS232, and any other wired-type communication device, standard, or methodology. In one embodiment, a network can be the Internet, which may be referred to as a global network.

In the embodiment shown, a server switch 108A can be a processor-based platform, such as a server. In one embodiment a server switch 108A can be operable to store a copy of some or all of transaction data received from one or more transaction devices 102A-N. The server switch 108A may store some or all of the transaction data in an associated database or data storage device, such as 110, 112, or 114. In another embodiment, a server switch, such as 108A, can be operable to generate a unique identifier, such as a reconciliation token, and associate the unique identifier or token with or otherwise add the unique identifier or token to a transaction record. In some embodiments, a server switch, such as 108A, can generate and associate a unique identifier or reconciliation token with some or all transactions which may be transmitted via a network, such as 106, by the system 100.

As shown in FIG. 1, the system 100 can also facilitate communications with one or more servers 116, 118, 122 and/or third parties 120. In the embodiment shown, some or all of the transaction-type devices 102A-N can be in communication with at least one of the following: a vend settlement server 116, a data services server 118, a financial institution 120, a third party server 122, and/or any device associated with a third party. In this embodiment, a transaction-type device, such as 102A, can transmit data via a network, such as 106, to a server switch, such as 108A. The server switch 108A can selectively transmit some or all of the received data to another transaction-type device, such as 102N; another server switch, such as 108N; a vend settlement server, such as 116; a data services server, such as 118; a financial institution, such as 120; a third party server, such as 122; or any other device associated with a third party. Data received by a vend settlement server 116, a data services server 118, a financial institution 120 and/or a third party server 122 can be stored in an associated database, such as 109, or other data storage device.

In one embodiment, a transaction-type device, such as 102A, can transmit data to a vend settlement server, such as 116, via a network, such as 106, and server switch, such as 108A. Data initially received or otherwise collected by the transaction-type device 102A can be transmitted to the server switch 108A in a format such as a data packet 124. The data can include, but is not limited to, vending equipment load-to-load (also referred to as fill-to-fill) information, vend transaction matching and reconciliation processing data, electronic find transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and/or any other type of data associated with a vending equipment transaction or a consumer. Ultimately, some or all of the data can be transmitted by the server switch, such as 108A, to a vend settlement server, such as 116.

In one embodiment, one or more reconciliation tokens can facilitate auditing some or all of the transaction data handled by one or more vend settlement servers 116 and/or third party servers 122. For example, a server switch, such as 108A, can communicate at least one reconciliation token with each transaction to a vend settlement server 116 and/or third party server 122, and receive transaction data from the vend settlement server 116 and/or third party server 122 in response to each reconciliation token. In this example, a server switch 108A can transmit at least one reconciliation token in a data packet 126 to a vend settlement server 116 and/or third party server 122. In response to the receiving one or more reconciliation tokens, the vend settlement server 116 and/or third party server 122 can transmit a data packet 128 with response data including the one or more reconciliation tokens to the server switch 108A. Such response data can be compared to previously transmitted transaction data or other data previously stored in a database, such as 110, 112, or 114, or other data storage device associated with the server switch 108A. In one embodiment, a vend settlement server such as 116 can be referred to as a third party server and can be audited in a similar manner described above.

Furthermore, in one embodiment, a server switch, such as 108A, can be operable to switch or otherwise transfer one or more transaction records between various destination servers. For example, transaction data stored on a particular server can be transferred to another server by way of a server switch, such as 108A. Moreover, a server switch 108A can be operable to issue a data packet 130 with one or more reconciliation tokens in response to transaction data received or transmitted by the server switch 108A. In addition, a server switch 108A can be operable to maintain at least one transaction database for storing transaction data, such as a plurality of databases including a KO database 110, reconciliation database 112, and device database 114.

In one embodiment, a server switch, such as 108A, can be operable to control access to a network, such as 106, by inspecting each transaction received at the server switch 108A. For example, before passing transaction data from a transaction-type device, such as 102A, to a destination location, the server switch 108A can check a database, such as the device database 114, to ensure that the transaction-type device, for instance 102A, from which the transaction is received is allowed to use the network 106. If the transaction-type device 102A is not allowed to use the network 106, the transaction data is not forwarded to the destination location and optionally the transaction-type device 102A can be informed by the server switch 108A that access to the network 106 is denied.

In another embodiment, a server switch, such as 108A, can be operable to control the types or classes of transactions a particular transaction-type device, such as 102A, is allowed to transmit on a network, such as 106. In this regard, the server switch 108A can inspect the type or class of transaction being transmitted, compare each transaction type or class to one or more allowed types or classes of transactions stored in a database, such as device database 114, and determine if such a transaction is allowed from the particular transaction-type device 102A. For example, if a transaction-type device 102A is deployed to accept a particular class of transactions, such as hotel room key cards, the server switch 108A can prevent or otherwise limit all other transactions, such as non-hotel room key cards, from being used.

Figure 2:
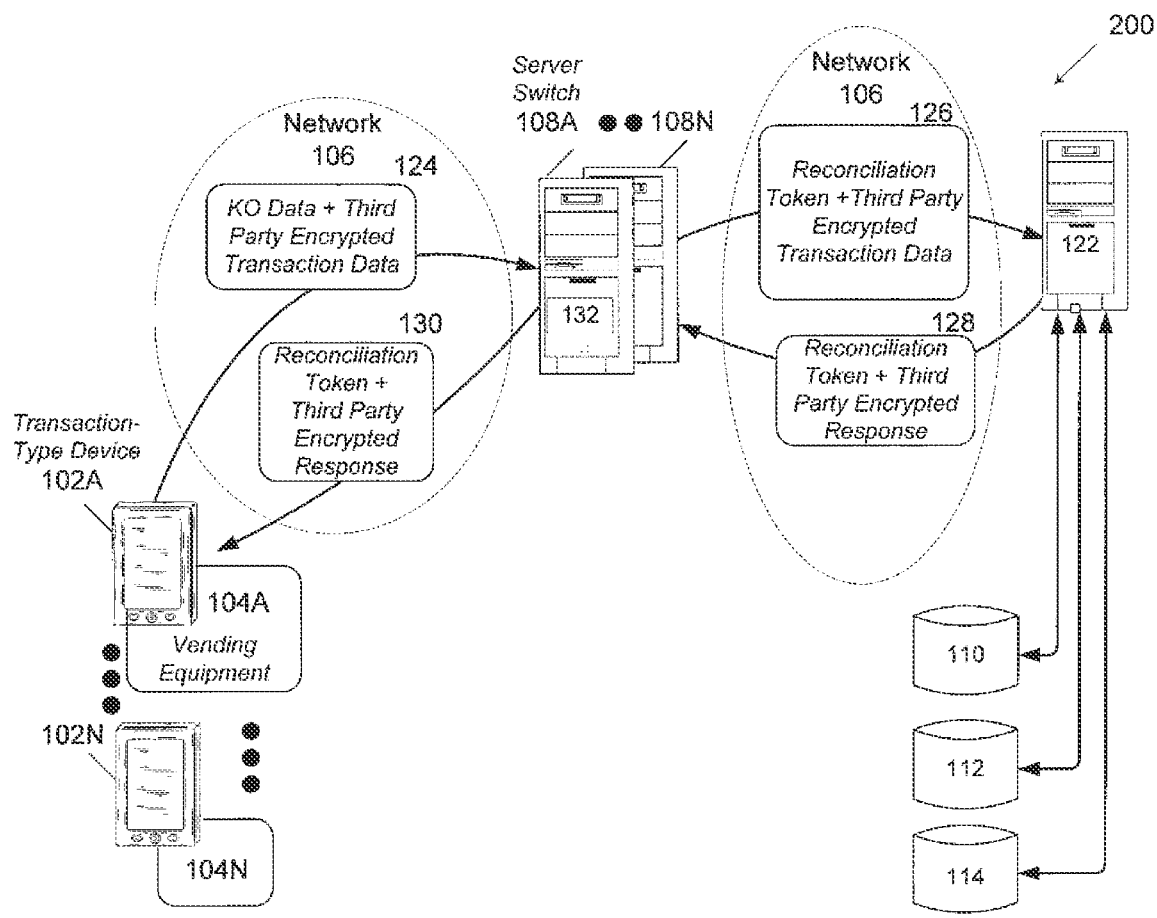
FIG. 2 illustrates an example of a system that uses a reconciliation token during communications between a server switch and a third party server and/or a settlement engine in accordance with an embodiment of the disclosure.

Referring to FIG. 2, an example system 200 for tracking one or more transactions in a vending network in accordance with an embodiment of the disclosure is shown. The system 200 can be implemented using some or all of the system components shown in FIG. 1, and in this example, some of the system components of system 100 are utilized. In this embodiment, the system 200 can include a data flow which commence when a transaction-type device, such as 102A, can initiate communication with a third party server, such as 118, by way of server switch, such as 108A. For example, the transaction-type device 102A can generate and transmit at least one data packet, such as 124, which can include transaction data that can be encrypted such that a third party server, such as 118, can decrypt the data by way of at least one decryption key. In some instances, the encrypted transaction data can include other data, such as KO data, and can be further encrypted wherein the server switch 108A can decrypt the data by way of another decryption key. In any instance, the server switch 108A can receive the encrypted data, or data packet 124, and after processing the encrypted data or data packet 124, the sever switch 108A can transmit a corresponding data packet, such as 126, to the third party server 122. After receipt and processing of the data packet 126, the third party server 118 can transmit a corresponding data packet, such as 128, to the server switch 108A, wherein the server switch 108A decrypts and processes the data. Processing of the data by a server switch, such as 108A, can include some or all of the following activities: verifying that a transaction-type device, such as 102A, is authorized to access a network, such as 106; verifying that a transaction-type device, such as 102A, is authorized to perform a particular transaction type or class; generating at least one reconciliation token; and storing data, such as KO data, in a database or data storage device, such as 110, 112, and/or 114.

Referring back to the server switch, the server switch, such as 108A, can generate at least one data packet by either generating at least one new reconciliation token if a particular transaction requires it (such as when an initial authorization request is made) or identifying and/or retrieving a previously assigned reconciliation token (such as when a third party server 122 is communicating a response to transaction-type device, such as 102A). The data packet, for example 126, can include at least one reconciliation token and previously received third party or transaction data. In some instances, the previously received third party or transaction data can be encrypted if desired. The data packet 128 can be communicated to the third party server 122.

Referring to the third party server, upon receipt of the data packet 126, the third party server, such as 122, can process the received data packet 126. Such processing can include, but is not limited to, decrypting the encrypted packet and acting on the data, or storing a reconciliation token and/or other associated transaction data in a database or data storage device, such as 110, 112, or 114.

During or after completion of processing the data packet 126 at the third party server 122, the third party server 122 can wait for a response to be communicated to transaction-type device 102A. In this regard, a data packet, such as 128, can be generated by the third party server 122 to include at least one previously received reconciliation token that was associated with the particular transaction at the server switch 108A, as well as response data from the third party server 122. In some instances, the response data from the third party server 122 can be encrypted if desired).

The third party server 122 can communicate the data packet 128 to the server switch 108A. The server switch 108A receiving the data packet 128 can use at least one reconciliation token to verify that a predefined transaction state sequence is being followed, and can update one or more state fields associated with the instant transaction. The server switch 108A can update one or more databases as necessary, and/or otherwise process the received data packet 128. The server switch 108S can communicate a corresponding data packet 130 to the transaction-type device 102A. The data packet 130 can be received at the transaction-type device, such as 102A, where the transaction-type device 102A can process the data packet 130 and associated response data. In this example, data packets 124, 126, 128, and 130 can be of the same or similar format.

In one embodiment, a state machine data structure can be established by a server switch, such as 108A, for a particular class of transaction. In this regard, the server switch 108A can determine if a particular transaction-type device, such as 102A, is allowed to perform a particular class of transaction (for example, a hotel room key card-type-transaction) and prevent or otherwise limit the transaction-type device 102A from performing certain types of transactions (for example, RFID credit card-type transactions). Using state machine logic or a set of instructions, the server switch 108A can ensure that a prescribed sequence of communications between the transaction-type device 102A and the third party server 122 is maintained.

For example, when a transaction-type device, such as 102A, facilitates a sales or vending transaction at a vending machine, such as 104A, by way of a user paying with a credit card, a state of the transaction can be as follows. Initially, a first state can be recorded by a server switch, such as 108A, as an initial authorization request by the transaction-type device 102A. Another state can be a response to the initial authorization request by a third party server, such as 122. Yet another state can be a completed sales record communicated from the transaction-type device 102A when the user completes the sales or vending transaction. Another state can be when the third party server 122 acknowledges the receipt of the completed sales transaction record communicated from the transaction-type device 102A.

In this embodiment, the state tracking capability of a server switch, such as 108A, related to each class of transactions and for each individual transaction can permit the server switch 108A to provide accountability for some or all transactions. This can include, but is not limited to, tracking which transactions are in a particular state of processing, and instructing a transaction-type device, such as 102A, and an associated third party server, such as 122, to adhere to a predetermined sequence of communications (also referred to as "state machine type logic"). In the case where a transaction sequence is unsuitable or otherwise incorrect, a server switch, such as 108A, can stop or delay a particular transaction from proceeding and/or send a message to either or both the transaction-type device 102A and the third party server 122. This feature can permit the server switch 108A to maintain accountability of each transaction-type device 102A-N, each third party server, such as 122, and to also maintain oversight of the manner in which transaction-type devices, such as 102A-N, and an associated third party server, such as 122, communicate to perform certain classes of transactions.

One aspect of using one or more state conditions to monitor, control and/or track transactions is that at any time a server switch, such as 108A, can determine which transactions have been completed. In this regard, such information can be used, for example, to more accurately identify transactions that may appear to have been lost. Such transactions may have been authorized, but never settled, as such, the state of these missing transactions is that the transactions may only have been partially completed (no sales information, no settlement, no EFT, etc.). This aspect permits a user, via the server switch, such as 108A, to identify possible issues related to payment for products and/or services. In addition, the user can identify issues related to any number of transaction-type devices 102A-N, servers such as a third party server 122, and/or other issues related to transaction processing by the system 100.

Figure 3:
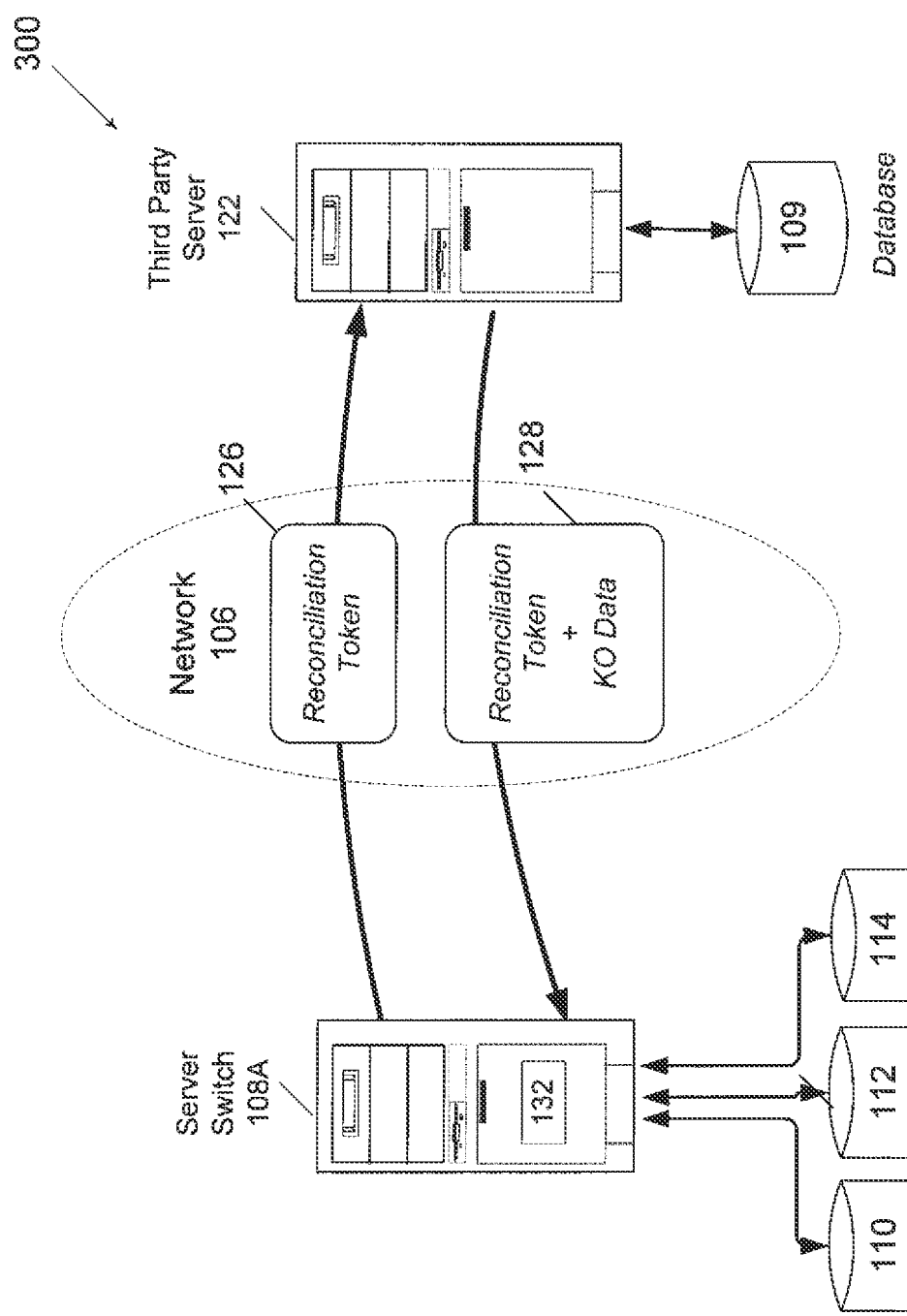
FIG. 3 illustrates an example of a system for auditing of a third party server in accordance with an embodiment of the disclosure.

Referring to FIG. 3, an example system 300 for providing a vending network in accordance with an embodiment of the disclosure is shown. The system 300 can be implemented using some or all of the system components shown in FIG. 1, and in this example, some of the system components of system 100 are utilized.

In the embodiment shown in FIG. 3, a vend settlement server, such as 116, can provide some or all operational and financial data processing for an associated operator server, such as 134. An operational server can be operable to manage vending equipment, such as 104A-N, and/or one or more associated vending routes. The vend settlement server 116 can be operable to coordinate the reconciliation of coins, bills, cashless transactions, and other types of inventory management data. As shown, the vend settlement server 116 can communicate with the operator server 134. With data provided by the vend settlement server 116, the operator server 134 can provide route management for vending equipment, such as 104A-N, including, but not limited to, reporting, route management, accountability, service, financial management, business analysis, asset management, product inventory management, and data processing. In this regard, a vend settlement server such as 116 can be operable for money reconciliation, pre-cashless settlement processing (determining the revenue cashless transactions should produce), post settlement processing (determining the revenue actually received from cashless transaction processing—as an example from EFTs), and coordinate the delivery of finds, inventory, and other vending equipment data to an associated operator server such as 134.

In operation, the operator server 134 can communicate with the vend settlement server 116. Initially, transaction data from one or more transaction-type devices, such as 102A, and associated vending equipment, such as 104A, can be received or otherwise collected by the server switch 108A. The server switch 108A can communicate further as needed or desired with a data services server, such as 118 and/or a third party such as a financial institution 120. As discussed previously, transaction data can be communicated by the server switch 108A to the vend settlement server 116 for processing and/or storage. Optionally, a vend settlement server, such as 116, can utilize one or more databases to store data as may be required or desired, such as a transaction database 109. In any instance, the vend settlement server 116 can communicate with the operator server 134 to handle some or all of the following activities reconciliation of coins, bills, cashless transactions, and other types of inventory management data; reporting; route management; transaction accountability; service; financial management; business analysis; asset management; product inventory management; data processing; money reconciliation; pre-cashless settlement processing (determining the revenue cashless transactions should produce); post settlement processing (determining the revenue actually received from cashless transaction processing—as an example from EFTs); and coordinate the delivery of funds, inventory, and other vending equipment data.

In this manner, reconciliation of bills, coins, and cashless transactions can be synchronized with the product or inventory that a route operators fills the vending equipment with, or otherwise restocks the vending equipment with. Delays in processing certain types of cashless transactions, such as credit card transactions, can result in less than 100% accountability of payment detail (bills, coins, and cashless revenues) at the time the route operator is restocking the vending equipment. As such, the ability to determine what has been sold and paid for can be difficult to determine at any given time and especially when cashless transactions are delayed by processing, such as pending electronic funds transfers (EFTs). In addition, the inability to accurately determine what has been purchased from the vending equipment can cause the route personnel to incorrectly select the restock product to load on to the route truck before traveling to the vending equipment location, which may cause too much or too little restock product to be carried on the route for subsequent restocking.

Figure 4:
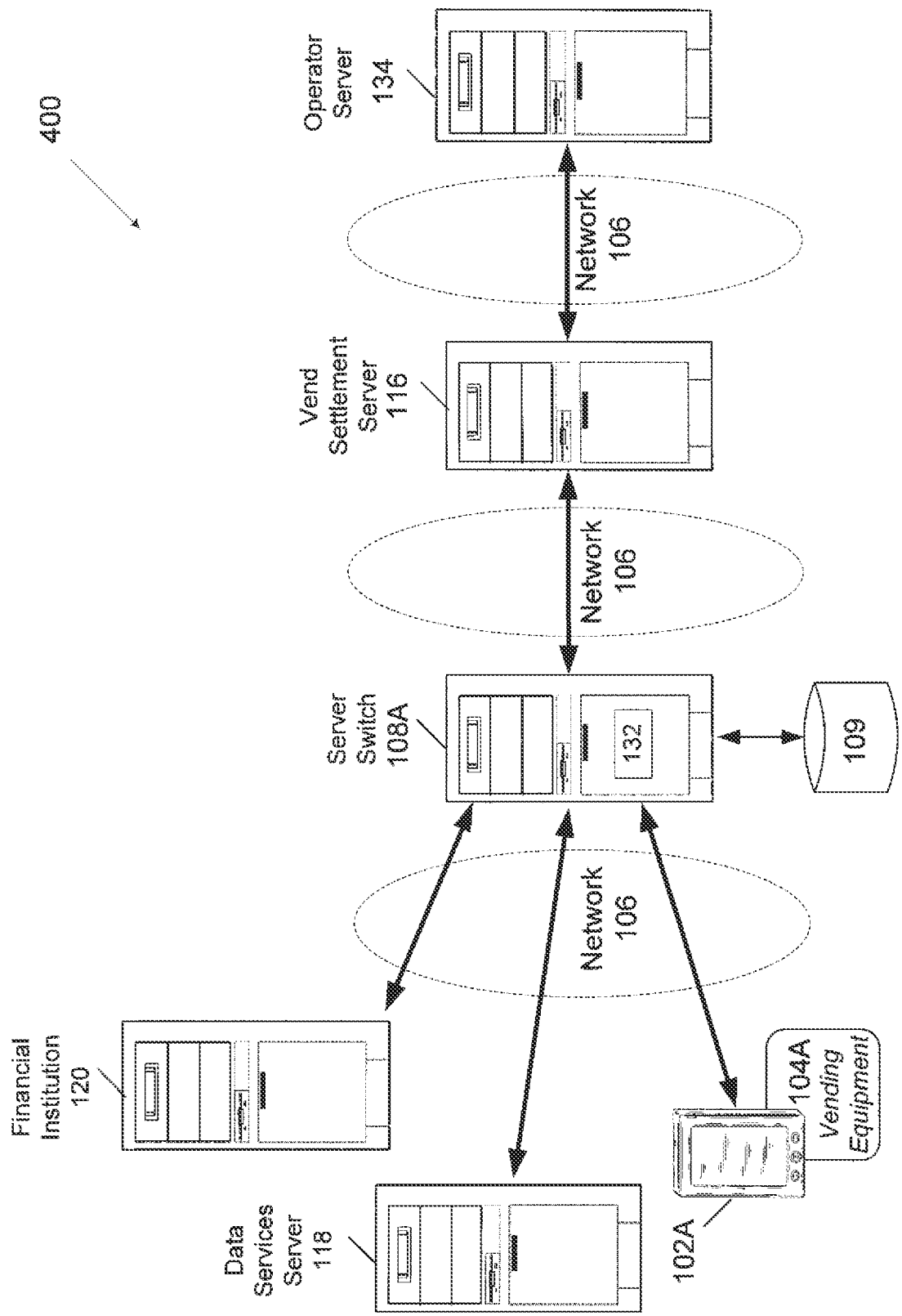
FIG. 4 illustrates an example of a system that utilizes a settlement engine to provide operational and financial data processing for an operator server in accordance with an embodiment of the disclosure.

In FIG. 4, an example system 400 for providing a vending network in accordance with an embodiment of the disclosure is shown. The system 400 can be implemented using some or all of the system components shown in FIG. 1, and in this example, some of the system components of system 100 are utilized. In the system shown, a server switch 108A can be in communication with a plurality of third party servers 122, such third party servers 122 utilizing a plurality of databases, such as transaction database 109. At least one of the third party servers 122 can be in communication with one or more financial institution servers 120, and by way of server switch 108A in communication with a plurality of transaction-type devices 102A-N. In this configuration, at least one third party server 122 can process transactions from the plurality of transaction-type devices 102A-N, and via server switch 108A can provide transaction level detail data and EFT level detail data to at least one vend settlement server 116, where such data is processed or otherwise reconciled with other data (non-cashless and other data) and then data communicated to the operator server 134.

In addition, optionally the server switch 108A can communicate with at least one financial institution server 120A and/or at least one data services server 118. In this regard, the server switch 108A can process transactions, providing as may be required and/or desired transaction level detail data, EFT level detail data, and/or other types of data or detail data to at least one vend settlement server 116, wherein the vend settlement server 116 with other data including data from at least one third party server 122 can process data and communicate as necessary with at least one operator server 134 to facilitate route management for vending equipment, such as 104A-N, including reporting, route management, accountability, service, financial management, business analysis, asset management, product inventory management, and data processing.

In the embodiment shown, a server switch, such as 108A can be in communication with one or more transaction-type devices, such as 102A-N, at least one vend settlement server 116, one or more third party servers 122, one or more financial institutions 120, and one or more data services servers 118. The transaction-type devices 102A-N can communicate different types of data, such data formatted in one or more data packets, to the server switch 108A. For example, a data packet 124 can include KO data and third party transaction data (encrypted if necessary). A second transaction-type device, such as 102B, may communicate formatted KO data illustrated as data packet 136. The flexibility of the server switch 108A to accommodate a plurality of different types of data, associated data packets, and data formats permits relevant data to be inspected and processed at the server switch 108A, such as KO data, as well as allow, if necessary, third party data (encrypted and/or otherwise proprietary) to be transmitted by the server switch 108A to a destination third party server, such as 122, and/or to a vend settlement server, such as 116.

An aspect of this embodiment is that collection of data from a plurality of transaction-type devices, such as 102A-N, at the server switch, such as 108A, can be relatively homogeneous across the plurality of devices, such as 102A-N. This can be implemented by some embodiments regardless of the type or purpose of the plurality of transaction-type devices. Another aspect of this embodiment is that oversight and accountability at the server switch, such as 108A and vend settlement server, such as 116, can be relatively easily maintained due in part to relatively homogenous data being received at the server switch 108A.

In another embodiment, an aspect is the ability for third party servers such as third party server 122 to receive data from the same transaction-type devices, such as 102A-N, in a format that allows the third party server 122 to continue operating as designed. In other words, transaction-type device, such as 102A, is operable to send a data packet (for instance, KO data and/or third party data) that can be both understood by the server switch, such as 108A, and by the third party server, such as 122. This permits both servers, the server switch 108A and the third party server 122, to function with minimal or no changes. This "shared data type function" can permit one or more third parties with their own information technology (IT) infrastructure, perhaps tailored to provide a particular product and/or service to their own customers, to use a vending network in accordance with an embodiment of the disclosure to both satisfy their third party data needs as well as satisfy needs of the server switch, such as 108A, a vend settlement server, such as 116, and/or an operator server, such as 134.

Another aspect of this embodiment can permit one or more third parties to provide various services to customers (web based and/or otherwise) from their own IT infrastructure while allowing a vending network in accordance with an embodiment of the disclosure, managed by the server switch, such as 108A, to maintain accountability, audit ability of the network, and utilize a vend settlement server, such as 116, to meet some or all of the needs of one or more vending route operators by way of an operator server, such as 134, and vending equipment personnel that may rely on the operator server 134 to operate or otherwise manage their respective businesses.

Figure 5:
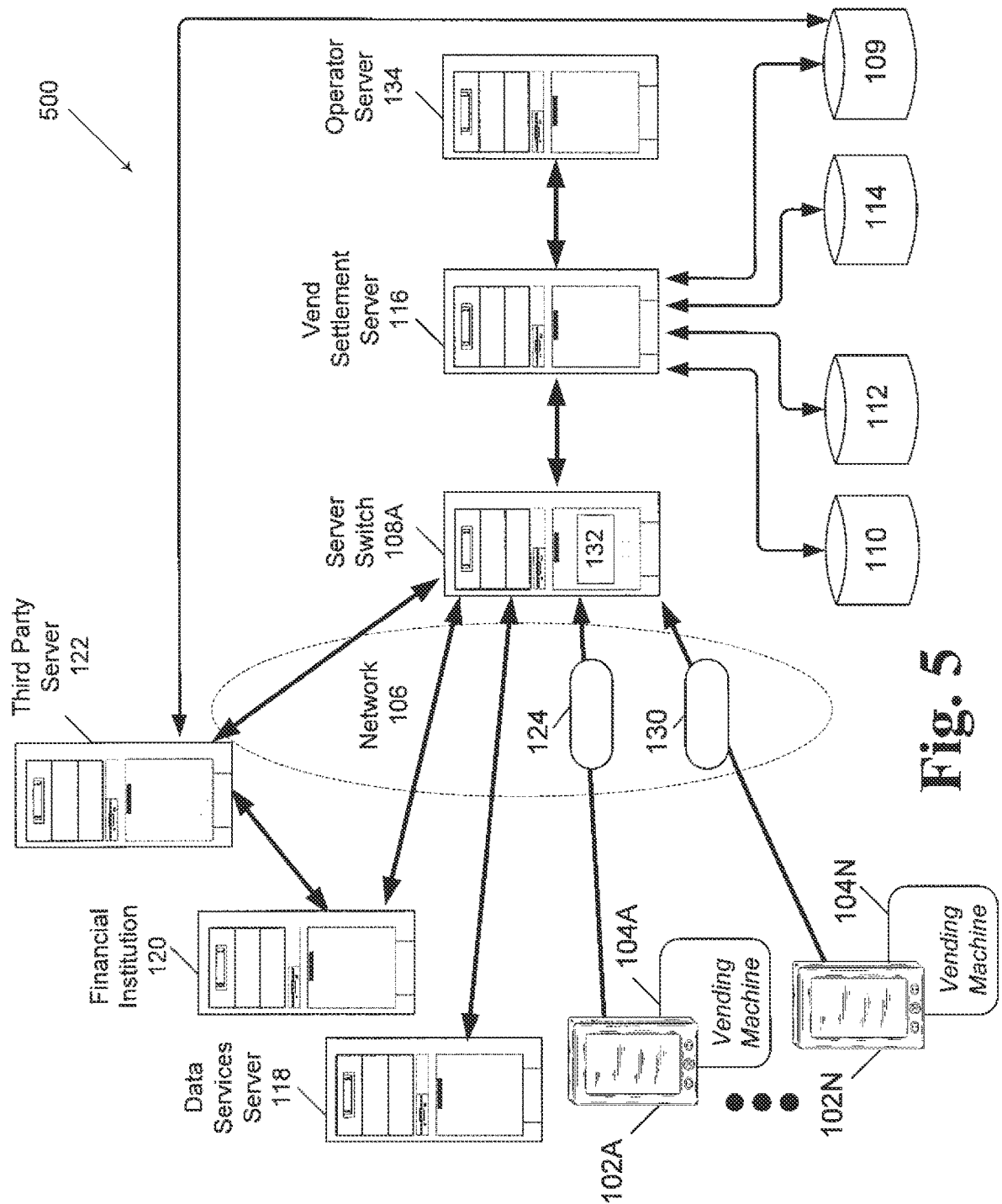
FIG. 5 illustrates an example of a system that utilizes a server switch to interface to devices, vend settlement servers, third party servers, financial institutions, and other data services in accordance with an embodiment of the disclosure.

In one embodiment of a system for providing a vending network, as illustrated in FIG. 5, one or more databases, such as 109, 110, 112, and 114, or data storage devices can be associated with either or both a vend settlement server, such as 116, and/or the server switch, such as 108A.

In one embodiment of a system for providing a vending network, as illustrated in FIG. 5, a vend settlement server, such as 116, can initiate an audit of a third party server, such as 122. In this regard, a vend settlement server, such as 116, can generate and transmit one or more reconciliation tokens to a third party server, such as 122, by way of transmitting a data packet to the third party server 122, and the vend settlement server 116 can receive a data packet including a response from the third party server 122.

Another embodiment of a system for providing a vending network can include a combination of servers, wherein a server originating an audit of a third party server, such as 122, can either be a server switch, such as 108A, or a vend settlement server, such as 116, and a data packet including a response from a third party server, such as 122, can be sent to a non-originating server, such as either the server switch 108A or a vend settlement server 116.

Referring to FIG. 5, an example system 500 for providing a vending network in accordance with an embodiment of the disclosure is shown. The system 500 can be implemented using some or all of the system components shown in FIG. 1, and in this example, some of the system components of system 100 are utilized. In this embodiment, the system 500 can include a plurality of server switches, such as 108A-N in communication with a plurality of transaction-type devices, such as 102A-N, and at least one vend settlement server, such as 116. The plurality of transaction-type devices 102A-N can utilize one or more of the plurality of server switches 108A-N to communicate with various data processing equipment, such as financial institution 120, the vend settlement server 116, and/or other third party servers, such as 122. The system embodiment shown can provide relatively flexible financial transaction handling and device network connectivity. In this manner, different transaction-type devices and server switches can be utilized to aggregate bills, coins, cashless, inventory, and/or other types and kinds of transaction data.

The flexibility and connectivity of the system embodiment shown can permit in some instances, certain cashless transactions to be processed where a sale amount is known but the actual funds are not yet available. For example, on occasion certain cashless transaction types, such as credit cards, may appear as a "good account" when authorized, but when it comes time to settle the transaction with the actual sale amount, the settlement process may sometimes fail. Such failures can occur for various reasons including the expiration of a credit card, an account being closed sometime after authorization but before settlement, and for many other reasons. In addition, there can be typically about a 24-72 hour delay from the time the settlement process occurs and the time the funds are actually available.

These circumstances, in combination with the fact that operators of vending equipment may need to synchronize coins, bills, and cashless transactions in a timely manner (often quicker then cashless funds are available) to facilitate route and inventory management, can provide a need to track cashless transactions in a pre-settled state, a post-settled state, and/or by EFT summary detail.

Pre-settled cashless transaction can be characterized as transactions that have been completed at vending equipment, such as 104A-N, and include a sale amount and any associated vend detail but still have to be communicated to a financial institution for settlement. Post-settled cashless transactions can be characterized as cashless transactions that have been communicated to a financial institution for settlement but funds may not be available. EFT summary detail can be characterized as the actual funds available that have been deposited (wired into a bank account).

In operation, there may be times when pre-settled cashless transaction details (sales that have not been settled) need to be combined with coins, and to reconcile vending equipment as well as to manage inventory. During other situations, post-settled cashless transaction detail may need to be relied upon, and finally EFTs may be reconciled to better manage the operator business. In one embodiment, the various states and conditions related to cashless transaction handling can be accommodated by the example system shown in FIG. 5.

As shown in FIG. 5, a financial institution, such as 120, can be in communication with at least one server switch, such as 108A-N, and at least one vend settlement server, such as 116. In this manner, the system 500 can handle various cashless transactions as well as provide a plurality of communication paths such that the server switches 108A-N and the vend settlement server 116 can synchronize some or all of the cashless transactions in a variety of states. The system 500 can also handle EFTs, coins, and bills, thus facilitating route management of vending equipment, products and service inventory, and/or financial accountability at an operator server, such as 134.

Figure 6:
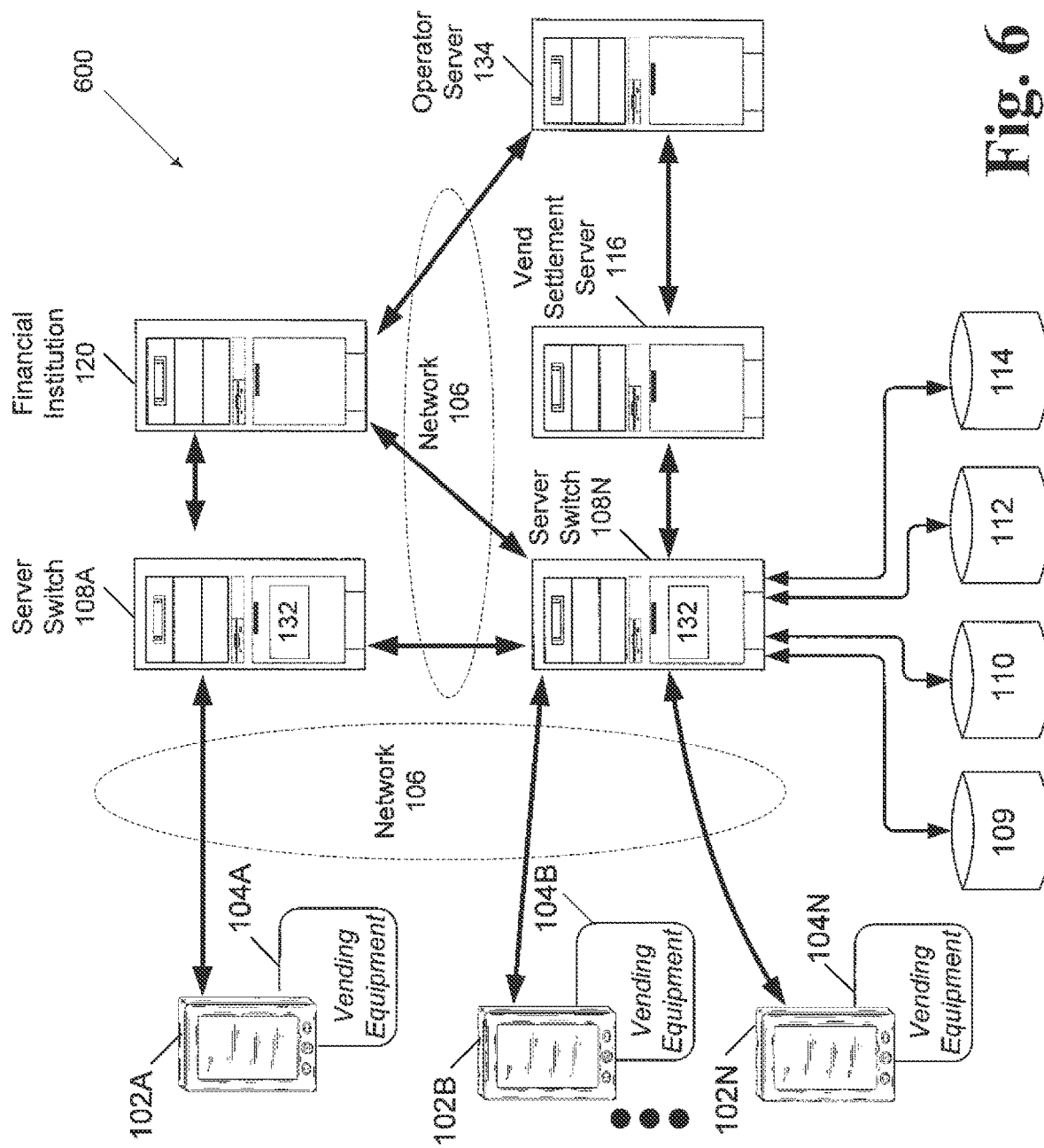
FIG. 6 illustrates an example of a system that uses a plurality of server switches to provide for relatively flexible financial transaction handling and device network connectivity via the plurality of server switches and/or the settlement engine in accordance with an embodiment of the disclosure.

Referring to FIG. 6, an example system for providing a vending network in accordance with an embodiment of the disclosure is shown. The system 600 can be implemented using some or all of the system components shown in FIG. 1, and in this example, some of the system components of system 100 are utilized. In this embodiment, the system 600 can include at least one server switch in communication with at least one property management system (PMS). For example in the embodiment shown in FIG. 6, server switch 108A can be in communication with property management system 138. In one embodiment, a property management system can be used in a hotel or other places to manage guest portfolios including check-in guests, assign rooms, accrue guest charges, and for performing other services. In another embodiment, a property management system can be used in a location where third party information is desired to be managed in a relatively secure location associated with the third party.

In one embodiment, the system 600 can process transactions associated with hotel room keys. For example, one or more hotel room key cards can be utilized to allow hotel guests to use a respective hotel room key card at one or more transaction-type devices, such as 102A-N. In some instances, a hotel guest may desire to have a product or service purchase added to his or her portfolio or invoice managed by a property management system, such as 138. In this regard, by using his/her hotel room key card, a guest can have his/her purchases at transaction-type devices 102A-N billed to his/her room and pay for the vended products and/or services when the hotel bill is paid.

In one embodiment, one or more transaction-type devices, such as 102A-N, can generate and send transaction data, such as data packets 124 shown in FIG. 1, to a server switch, such as 108A. In certain instances, property management may not want certain transaction data, such as hotel key card data, to leave the premises for security reasons, and the use of a wide area network (WAN) configuration where a server switch is located at a remote location may not be acceptable to property management. One aspect of a server switch, such as 10A, can be the location of the server switch at or on property owned or otherwise controlled by property management. In this manner, a server switch, such as 108A, can communicate with a plurality of transaction-type devices, such as 102A-N, which may be hotel key card reading devices, and also communicate with the property management system, such as 138.

In one embodiment, certain transaction data such as hotel key card data can remain onsite, but other transaction data, such as credit card transactions, sales information, inventory, service, and other data may be acceptable to communicate remotely. In this example, a first server switch, such as 108A, can communicate with one or more other server switches, such as 108N, and as necessary, to one or more vend settlement servers, such as 116, third party servers, such as 122, operator servers, such as 134, and/or to other data processing equipment.

In one embodiment, a server switch, such as 108A, can be integrated into at least one transaction-type device, such as 102A-N. In this example, at least one of a plurality of transaction-type devices, such as 102A-N, can function as a server switch in addition to performing various features and functions as a transaction-type device, such as 102A-N. In this regard, a system in accordance with an embodiment of the disclosure may implement one or more micro-type server switches with respective transaction-type devices rather than having an independent server switch serving the transaction-type devices.

Figure 7:
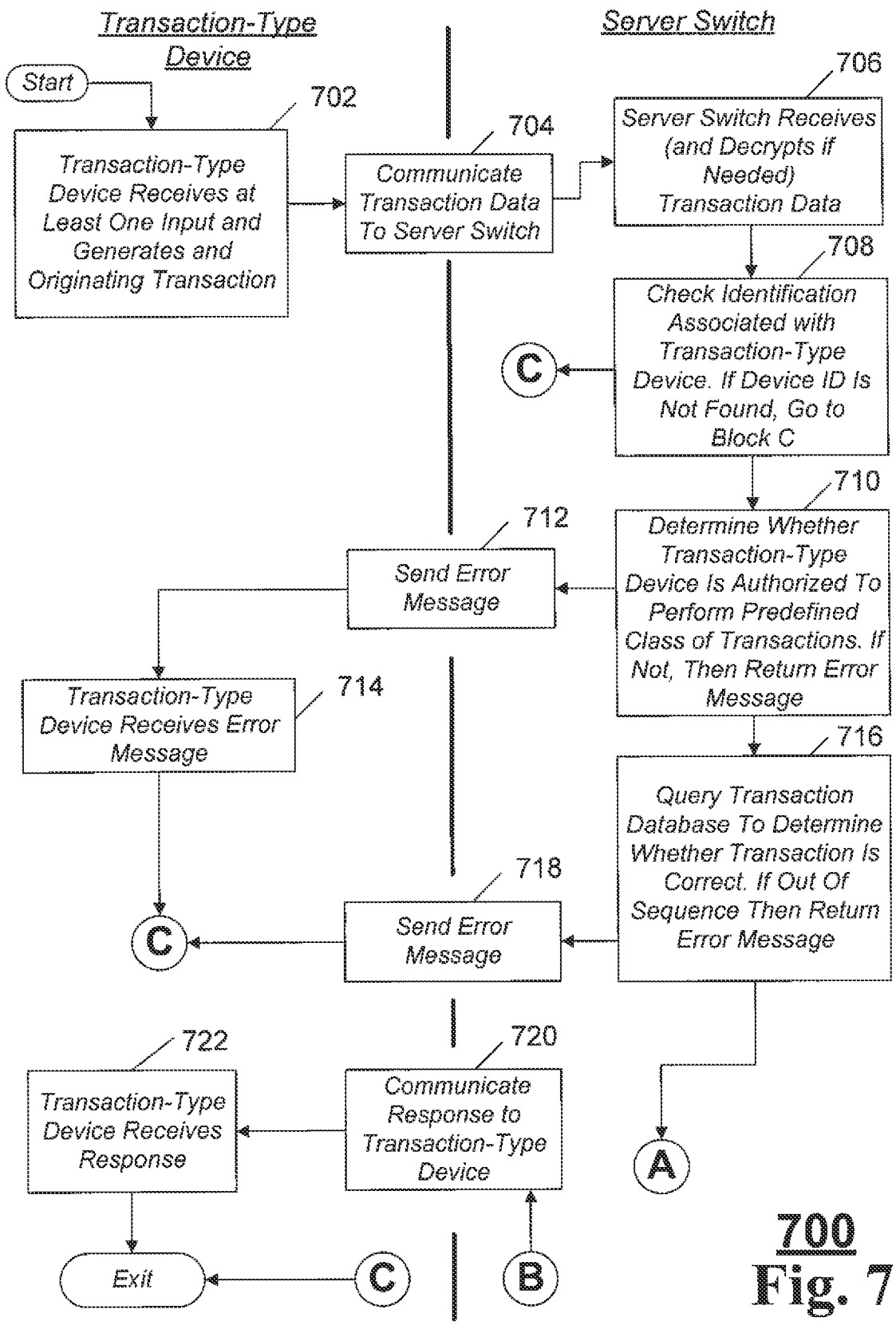
FIG. 7 illustrates example methods using a server switch generated reconciliation token to administer transaction level accountability in accordance with an embodiment of the disclosure.

FIG. 7 illustrates an example method for providing a vending network in accordance with an embodiment of the disclosure. In this embodiment, a method 700 for providing a vending network can be implemented by a system such as 100 in FIG. 1.

The method 700 can begin at block 702, in which inputs for cashless transactions and cash transactions are received from a plurality of transaction-type devices associated with respective vending machines. In the embodiment shown in FIG. 7, one or more transaction-type devices, such as 102A-N, associated with respective vending machines can receive inputs for cashless transactions and cash transactions.

Block 702 is followed by block 704, in which transaction data associated with some or all of the transactions is transmitted to at least one server switch. In the embodiment shown in FIG. 7, transaction data associated with some or all of the cashless transactions and cash transactions are transmitted by the transaction-type devices 102A-N to a server switch, such as 108A.

Block 704 is followed by block 706, in which some or all of the transactions can be settled via at least one vend settlement server. In the embodiment shown in FIG. 7, the server switch 108A can transmit some or all of the transactions to a vend settlement server, such as 116, where some or all of the transactions can be settled or otherwise reconciled. In one embodiment, a server switch such as 108A can associate a respective reconciliation token with some or all of the transactions. The method 700 ends after block 706.

Figure 8:
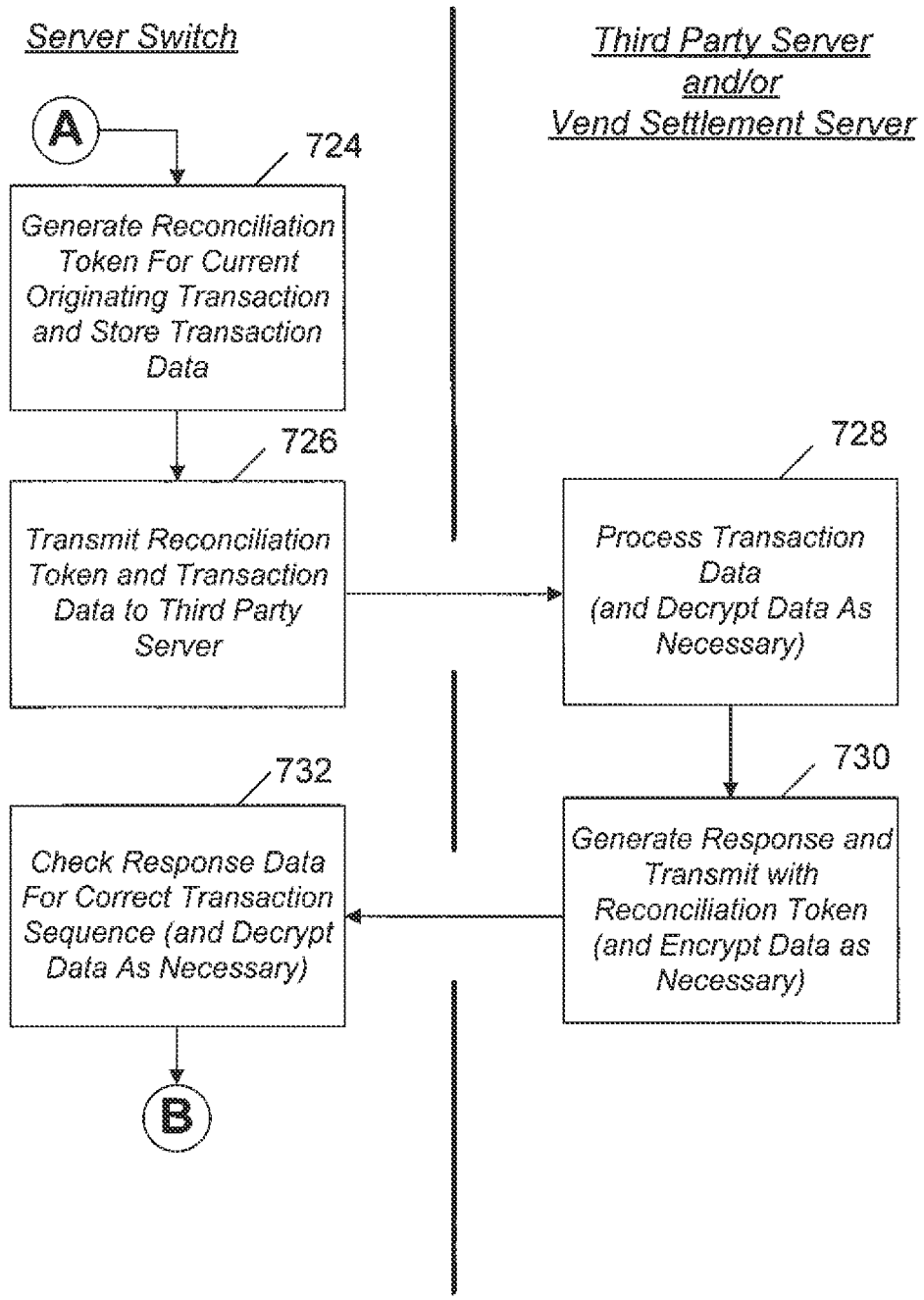
FIG. 8 illustrates example methods using a server switch generated reconciliation token to administer transaction level accountability in accordance with an embodiment of the disclosure.

FIG. 8 illustrates another example method for providing a vending network in accordance with an embodiment of the disclosure. In this embodiment, a method 800 for providing a vending network can be implemented by a system such as 100 in FIG. 1. The method 800 can begin at block 802, in which inputs for cashless transactions and cash transactions are received from a plurality of transaction-type devices associated with respective vending machines. In the embodiment shown in FIG. 8, one or more transaction-type devices, such as 102A-N, associated with respective vending machines can receive inputs for cashless transactions and cash transactions.

Block 802 is followed by block 804, in which transaction data associated with some or all of the transactions is transmitted to at least one server switch. In the embodiment shown in FIG. 8, transaction data associated with some or all of the cashless transactions and cash transactions are transmitted by the transaction-type devices 102A-N to a server switch, such as 108A. Block 804 is followed by block 806, in which a respective reconciliation token is associated with some or all of the transactions. In the embodiment shown in FIG. 8, the server switch 108A can associate a respective reconciliation token with some or all of the transactions. Block 806 is followed by block 808, in which some or all of the transactions are settled via at least one vend settlement server. In the embodiment shown in FIG. 8, the server switch 108A can transmit some or all of the transactions to a vend settlement server, such as 116, where some or all of the transactions can be settled or otherwise reconciled. The method 800 ends after block 808. The capabilities of various embodiments of the disclosure can be implemented in software, firmware, hardware or some combination thereof.

As noted above, with the complexity and number of standardized financial transaction cards and safety/security features on them, a unified customer experience will enhance the customer experience. Using the information could also allow machine owners or operators to maximize profits or otherwise control the type of transaction used to achieve the best fee profile.

A user payment interface as disclosed herein will allow consumers to make a debit or credit based vend regardless of the technology in the bank card or mobile device they have. In most instances, the vend will occur with a single pass of the bank card (standardized financial transaction card). To ensure, success, the user payment device should be intuitive and encourage consumers to use credit and debit cards. The payment process should be consistent across all card types and be instinctive to the consumer.

This disclosure further incorporates by reference U.S. Pat. No. 8,875,994 (Theobald 2014) as follows to show the use environments in which the claimed embodiments may operate.

In some embodiments, the user payment interface comprises a bezel which can be fit with a bill acceptor or not, and could be new or retrofitted into existing machines. The bezel (or terminal) can manage the complexity of the various card types and technologies that exist already as well as new technologies that are being developed. The bezel will include at least one reader (media sensor) compatible with the various magnetic stripe, chip and contactless payment schemes in the US, Canada, Europe and Australia, and any other desired financial system. The disclosure herein relates to a payment interface system, including the payment interface apparatus (e.g. bezel, terminal, etc.) and a transaction type controller, the payment interface apparatus itself, the transaction type controller itself, and methods of using them.

As set forth in the Theobald '994 patent, to better understand the system and its parts, it is helpful to have an understanding of card and sensor types, transaction types, and the electronic payment process. The following subheadings are incorporated from U.S. Pat. No. 8,875,994. to provide background and potential uses for claimed embodiments of this disclosure.

General Industry Standards for the Different Card Interface Formats. The devices and methods of the present invention described herein are useful for either employing a credit card or a debit card, or other standardized financial transaction card. Generally, the transaction card has at least a magnetic strip on its surface that may be swiped at a POS terminal to complete a transaction for payment for a good or service. The methods of such a transaction are typically within the ISO/IEC 7810 standard which defines the dimensions as 8.560.times.5.98 millimeters. All standardized dimensions typically have a thickness of 0.76 for a card. Some transaction cards may be imbedded with a hologram to avoid counterfeiting.

A smart card may also be known as a chip card or an integrated circuit card. A smart card is well known in the art and has an imbedded integrated circuit which can process information. A smart card can receive an input which is processed by way of the integrated circuit or chip with an application based on it and then deliver an output. A contact smart card has a contact area comprised of several gold-plated contact pads that is about a centimeter square. When the contact smart card is inserted into a reader that makes contact with electrical connectors that can read information from the chip and write information back. A typical smart card follows the dimensions of ISO/IEC 7810 which determines the dimensions of the card and ISO/IEC 7816 which defines the physical location and electrical characteristics of the chip. Contact smart cards typically do not contain batteries and the energy is supplied by the card reader for functions that are done on the chip. Contact smart cards typically have standard communication protocols so that a smart card may be used in different readers and transactions can be completed. Contact smart cards are used as communication medium between a smart card and a host, and such host may be a computer, a POS terminal, a mobile phone, a transit entry point, a public phone, and the like.

Another type of smart card is known as a contactless smartcard. A contactless smartcard contains a chip that communicates with a card reader through RFID induction technology, or other contactless technology. A contactless smartcard requires only proximity to an antenna to complete the transaction. A contactless smartcard is typically defined by the dimensions of a standard transaction card, for example, ISO/IEC 7816, and will have a standardized communication protocol, for example as defined by ISO/IEC 1443. Typically, a contactless smartcard may be in communication at distances of up to ten centimeters. A standard for contactless smartcard is ISO/IEC 15693 which allows communication at distances up to 50 centimeters. Other standards may be available at larger distances for applications such as mass transit and toll roads.

A smart card may have more than one technology on it. For example, a smart card may have a magnetic strip and a chip. A smart card may have a magnetic strip, a chip and a contactless interface all on one card. A smart card may have a chip and a contactless interface on one card. Sometimes a smart card having a magnetic strip and at least a chip may be known as a hybrid smart card. The devices and methods of the present invention described herein are useful with a card having any or all of these media types.

IC Card Reader Example

The Theobald '994 publication (U.S. Pat. No. 8,875,994) further explains the context of an integrated circuit card reader. As further shown in Theobald '994 and reproduced here as FIG. 19, an exemplary IC (chip) card reader is disclosed. A plurality of signal contacts 30 are positioned within a rearward portion 14a of housing 14 opposite a slot ingress 22a. Contacts 30 protrude from the rearward portion 14a and extend normal relative to a plane in which slot 22 is defined. Each of contacts 30 includes a deflectable spring-like interior extent 30a for wiping engagement with contact pads 25a defined on a surface of card 25 and an exterior extent 30b having a tail portion for termination with a PCB such as flexible PCB 33. As card 25 is linearly inserted into slot 22 and toward rearward portion 14a, spring-like portions 30a come into sliding engagement with contact pad 25a of card 25 so as to clean dirt and debris therefrom. A similar wiping action is experienced by card 25 upon retraction of the card from slot 22 after completion of a card reading operation.

Unlike connectors utilizing a base and cover combination, connector 10 can simply accept a smart card 25 in slot 22. It is important that the surface of card 25 having contact pad 25a thereon is face up in relation to upper surface 16 of housing 14 so as to align contact portions 30a with contact pad 25a. Guides 16a and 18a (below card 25) cooperate to maintain the planar insertion path of card 25 until engagement of contact pad 25a initiates a card reading operation. It is further noted that the housing may support one or more switching contacts (not shown) as is conventionally known, so as to provide an indication of proper card insertion and further initiate a card reading operation. Those of skill in the art will be aware of other suitable card reader designs.

The Payment Process

Figure 12:
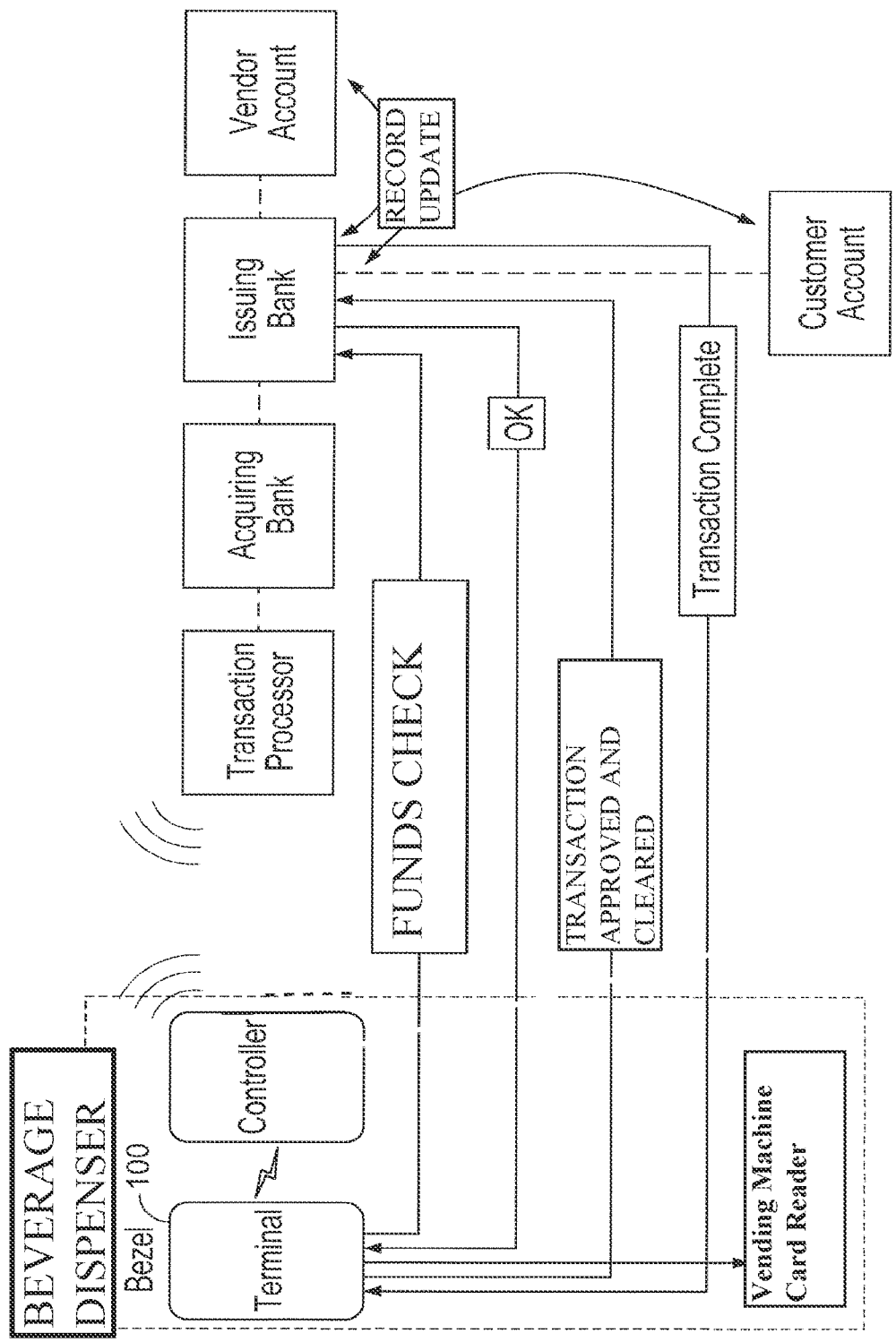
FIG. 12 is a PRIOR ART schematic illustrating an exemplary electronic payment process.
Figure 13:
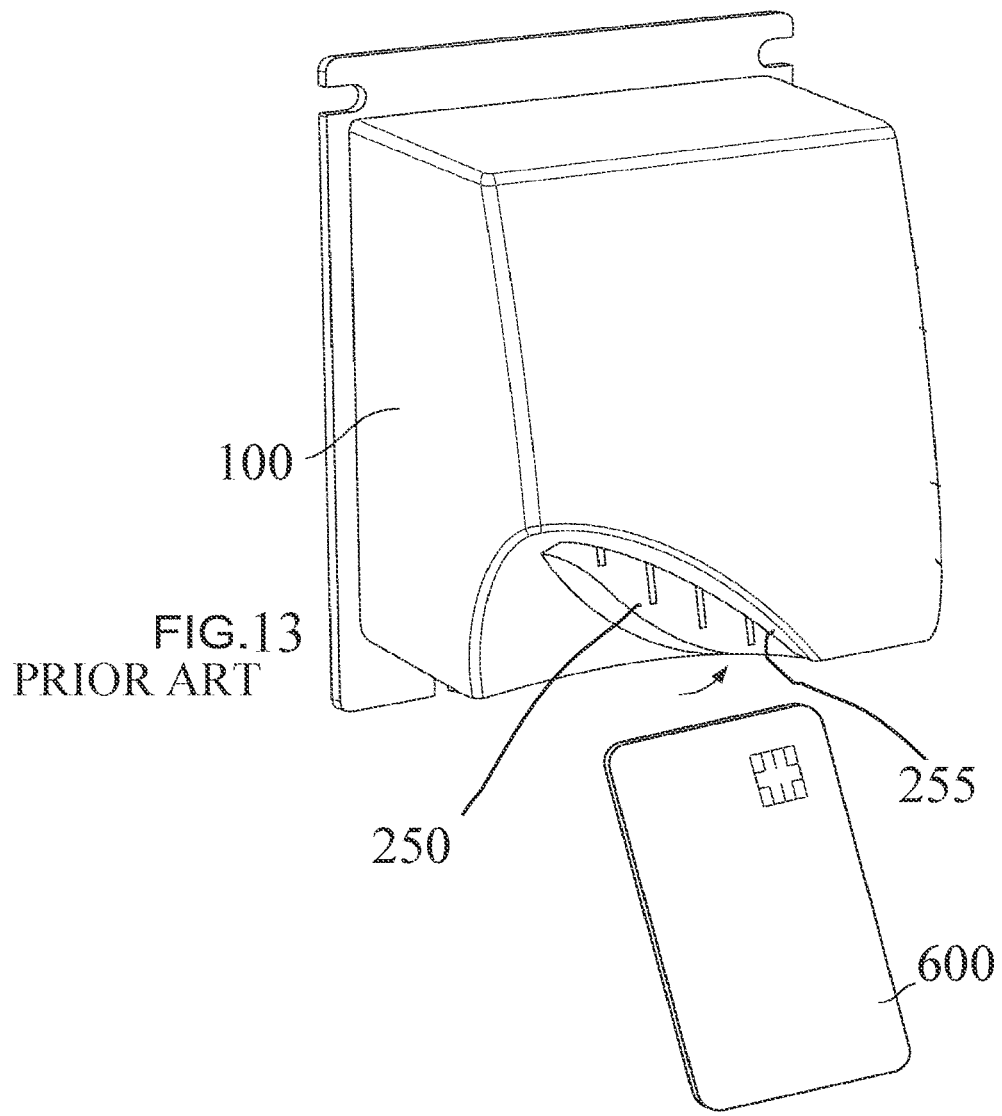
FIG. 13 is a PRIOR ART perspective view of a bezel or terminal configured to receive a payment device such as a bank card in accordance with some embodiments disclosed herein.
Figure 14:
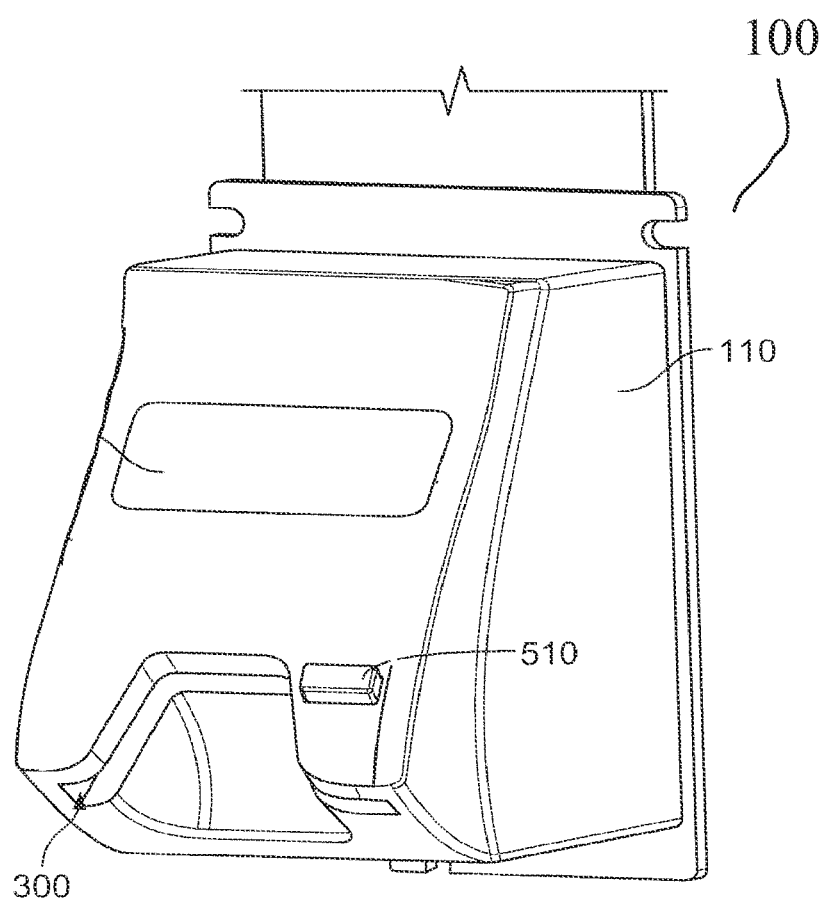
FIG. 14 is a PRIOR ART perspective view of a bezel or terminal configured to receive a payment device such as a bank card in accordance with some embodiments disclosed herein.
Figure 15A:
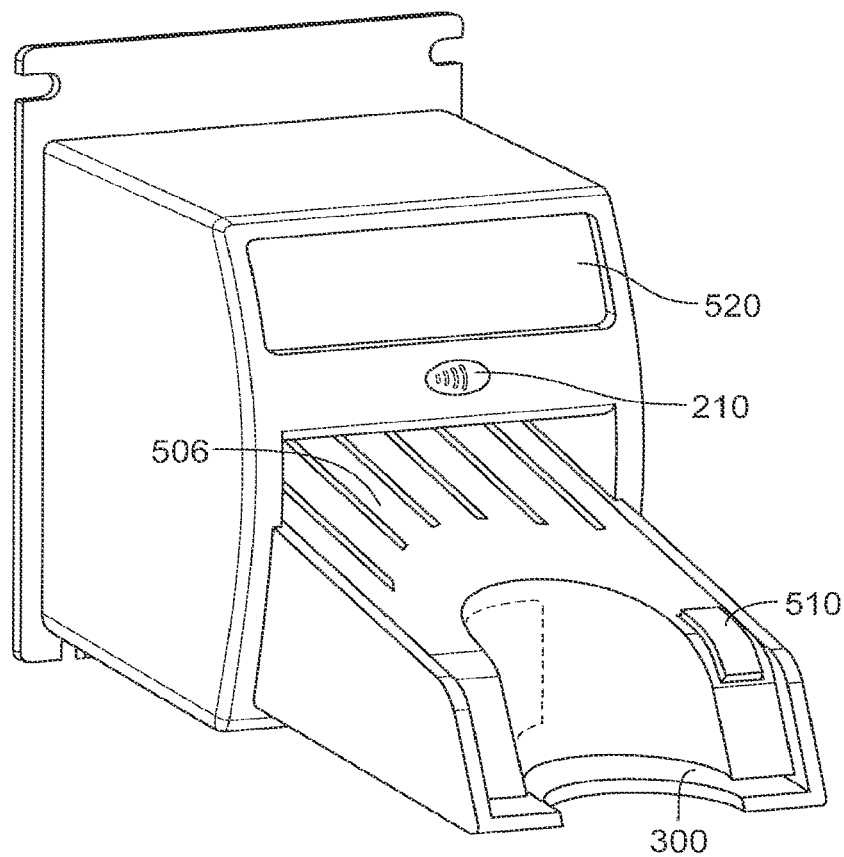
FIG. 15A is a PRIOR ART perspective view of a bezel or terminal in accordance with some embodiments disclosed herein.
Figure 15B:
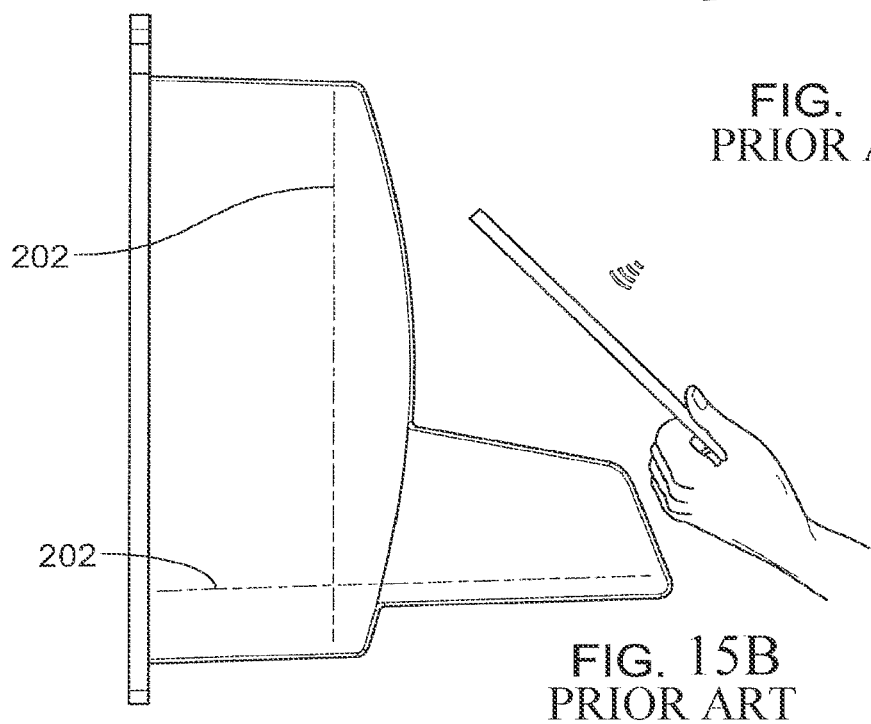
FIG. 15B is a PRIOR ART cross-sectional view of a payment bezel or terminal with a payment device or bank card inserted therein in accordance with some embodiments disclosed herein.
Figure 16:
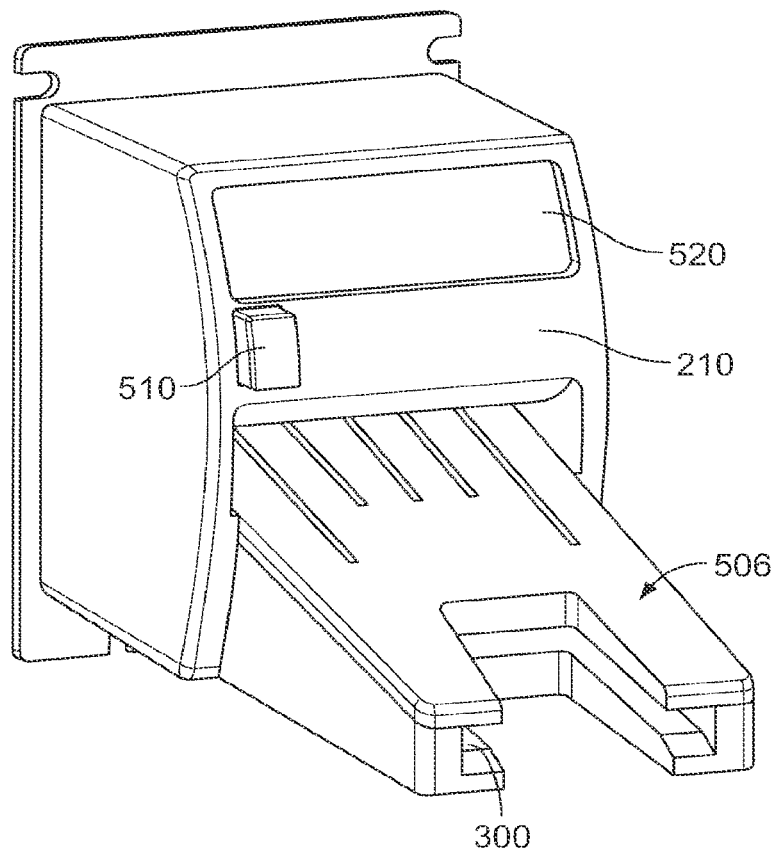
FIG. 16 is a PRIOR ART perspective view of a bezel or terminal in accordance with some embodiments disclosed herein.
Figure 17:
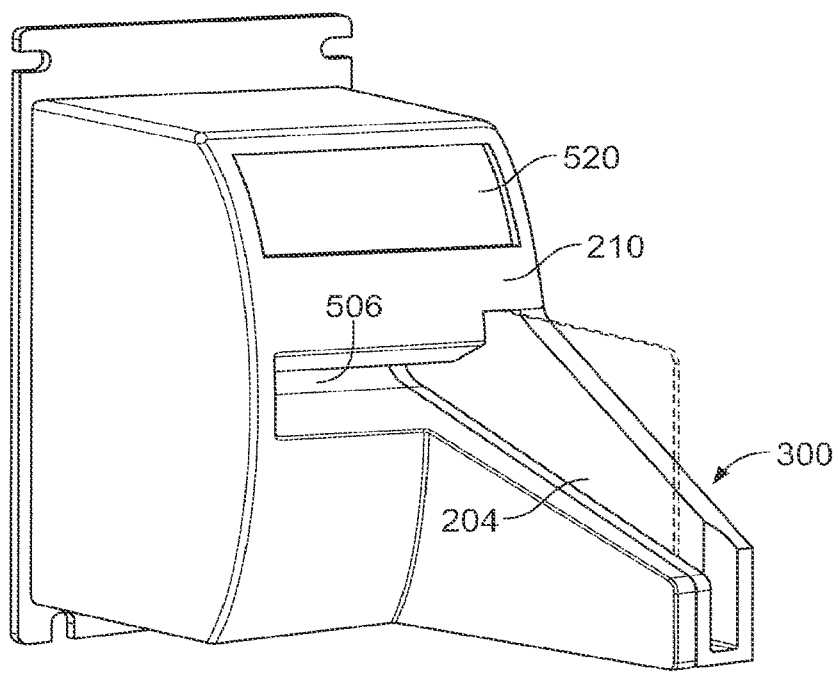
FIG. 17 is a PRIOR ART perspective view of a payment bezel or terminal in accordance with some embodiments disclosed herein.

Continuing with using the Theobald U.S. Pat. No. 8,875,994 as incorporated by reference herein, the '994 patent illustrates a flowchart of an exemplary payment system and process. That flowchart is reproduced as FIG. 12 of this disclosure. A standardized transaction card is presented at a merchant (e.g. vending machine 10), credit card data is transferred to the controller, which then transmits the data to an outside transaction processor which handles information from the various banks, the merchant account, and the customer account.

The Payment Process of Theobald '994 background patent is incorporated by reference herein and set forth as follows.

When using a credit or debit card outside of a vending type situation, with the notable exception of gasoline (petrol) stations, in most retail applications (e.g. shops, bars, hotels, etc.) you pay with your credit or debit card after the bill has been presented, in exactly the same way as cash. If the consumer's card can handle both debit & credit payments the retail terminal will normally, but not always, give the consumer the choice of which transaction to use.

Unattended point of sale applications (e.g. vending, etc.) typically handle the payment the other way round, the cash is presented first and then the selection is made. This presents unique challenges if the consumer experience is to be consistent when paying with cash or card or mobile phone, or other cashless device.

If the consumer's card can handle both debit and credit payments the unattended point of sale typically does not offer a choice, the transaction is simply processed on the default transaction set up on the card.

To add to the complexity, debit, credit and other standardized bank cards may use a security feature, and often, more than one, in turn, some of these involve online payment methods and some do not.

Magnetic Stripe and Chip (Both Debit & Credit) and US Contactless from Theobald '994. Magnetic stripe and Chip and US contactless transactions are on-line because there is no value stored on the card. Some contactless type transaction, e.g. Paypass, Paywave and Expresspay, emulate a magnetic card swipe. The authorization happens in real time but the clearance (settlement) can be done as a batch at a later stage. There are two ways this is handled in the US: pre-authorization or via an open-connection.

With pre-authorization, the card is presented to the terminal at the merchant and card info passes to the controller. The controller communicates with the machine or tills to determine transaction value. The transaction value is then sent to the transaction processor for authorization. The transaction processor routes the request for authorization through the acquiring bank. The acquiring bank contacts the bank that issued the card. The issuing bank check the cardholder account to confirm funds are available. The answer is routed back to the merchant. If the authorization is given the payment is confirmed and passes back through the same route to the issuing bank. The issuing bank then transfers the money from the cardholders account to the merchant account. This, of course, is all handled in relatively short time via the passing of electronic data via to and among the various systems and processors involved.

The value authorized does not have to match the payment made. For example, a restaurant may process authorization for the price of food but add any gratuity to the final settlement. Petrol stations typically pre-approve to a higher amount and then adjust to the amount of fuel actually purchased.

In open connection systems, when the card is presented either by swiping or tapping the controller opens the connection with the transaction processor. The consumer is prompted to "Make Selection." The actual vend price is authorized. The connection remains open on multi vend machines for a configurable period of time.

Online/Offline prepaid and Non-US contactless systems may pre-paid cards in addition to online authorizations. Prepaid cards have stored value on the card. EMV Contactless cards are loaded with available funds in the form of secure value credits which are decremented during the transaction and only become money when they are spent. Prepaid cards have no need to go online. Contactless, such as EMV, typically go online either to process payment or to occasionally check on the card status. Because the value is stored on the card there is no pre-authorization required other than for the controller to confirm there are sufficient credits to make the purchase. Once the transaction is made the credits (payment) is processed in the same way as an online transaction but because the value is already authorized this does not necessarily have to be done in real time. Transactions can be batched up to reduce transaction fees.

Accordingly, in the prior Theobald '994 patent, a single payment interface device (bezel, terminal) has been designed to sense and read data present on multiple media types on a single card. Particularly, the device is designed such that inserting a card into a single slot will facilitate reading of multiple card types on the card.

As set forth in the Theobald '994 patent (U.S. 8,875, 9940), a payment interface system may include (a) a user interface further incorporating i. a housing, ii. a plurality of media sensors for sensing card data and media type, the plurality of media sensors each being selected to read a different media type, iii. a singular card path for guiding a standardized financial transaction card having card data stored on at least one media type, and each media sensor is positioned and located within the housing and along the singular card path such that user action of inserting a standardized financial transaction card into and along the singular card path places each media type present on the card in operative communication with a corresponding media sensor, and (b) a transaction type controller further includes i. a memory for housing a set of stored instructions regarding determining a desired transaction type to present for payment based on media type, when multiple media types are present in a single standardized financial transaction card, ii. a processor in communication with the plurality of media sensors for obtaining card data and media type and for implementing the stored instructions to determine the desired transaction type based on available media types on the standardized financial transaction card and the stored instructions, and capable of communicating the desired transaction type along with card data to a payment controller.

The media type may be any media type suitable for inputting, storing, outputting, and updating data on a standardized financial transaction card. The media type can be, but is not limited to magnetic stripes, integrated chips, integrated chips and pins, RF devices, and near field communication (NFC) devices.

Accordingly, the media sensors may be any suitable media sensor appropriate for sensing media types found in standardized financial transaction card. For example, suitable media sensors include, but are not limited to, magnetic stripe readers, chip readers, chip and pin readers, contactless readers, prepaid card readers, RF readers, and near field communication (NFC) readers, etc.

In some embodiments of U.S. Pat. No. 8,875,994 (Theobald), at least one of the plurality of media sensors is a contact or contactless reader positioned such that contact or contactless media may be read when in operative proximity of the housing without entering the single card slot and path. In this manner, a single interface could accept a card in its card slot, but also accommodate contact or contactless use without the slot. This arrangement would also allow use of a non-card (e.g. smartphone) outfitted with appropriate contact or contactless technology.

It should be appreciated that from time to time, it may be beneficial for the user interface to communicate with the user. Any suitable communication device or combination can be used. For example, video and/or audio cues may be provided to the user. As such, the interface could be provided with a display device, an audio device or combination thereof.

Although this background and use environment discussion of the U.S. Pat. No. 8,875,994 concentrates on preparation of a cashless device, it should be appreciated that the device could also be configured for use with cash and coin based systems as well. Thus, in some embodiments, the payment interface device may also be provided with a bill acceptor. In some embodiments, the bill acceptor can be positioned at a top height, a lower height or a mid-height position. As illustrated in FIGS. 13-19 at the mid height position the bill path may cross the singular credit card path. This situation allows for space savings, which is important in vending operations. In this case, the bill acceptor defines a slot therethrough for allowing a card to pass therethrough. In some embodiments, the bill acceptor may employ a shutter or other system to minimize bills catching on the slot. Other designs and positions are possible, both with and without cross-over between the bill path and the card path.

It should also be noted that although the focus of this disclosure has been on apparatus systems and methods placed in a vending machine, similar systems could be established outside of a vending machine, for example in a handheld card reader that might be useful for example at stadium events or anywhere where a non-vending credit card authorization may be needed. For example, as part of a POS register, a separate POS credit card processor, or as a handheld POS device (such as exemplified in FIG. 18). Some embodiments of such device include a plurality of media sensors in communication with the transaction type processor for determining which transaction type to pass along to the controller and ultimately to the transaction processor and various banks. The transaction type controller may be the same as or different from the controller. All communications may be wired or wireless, or a combination thereof.

Additionally, to facilitate user satisfaction, the interface may employ a user input device, which could be as simple as a single key, multiple keys, or even a touch screen, etc. In some embodiments, a payment interface system comprises: a. a user interface (e.g. bezel/terminal) further comprising: i. a housing, defining a single card slot and single card path for accepting a standardized financial transaction card having card data stored on at least one media type, ii. a plurality of media sensors, for sensing card data and media type, each media sensor is positioned and located within the housing such that user action of inserting a standardized financial transaction card into the single card slot and along the single card path, places each media type present on the card in operative communication with a corresponding media sensor, the plurality of media sensors are each selected from a different media type, said media type selected from magnetic stripe readers, chip readers, chip and pin readers, contactless readers, prepaid card readers, RF readers, and near field communication (NFC) readers, wherein any contact or contactless reader is also positioned such that contact or contactless media may be read when in operative proximity of the housing without entering the single card slot and path; iii. a communication device for communicating with the user, wherein the communication device is a display device, an audio device or combination thereof, iv. a bill acceptor; v. a user input device (i.e. one or more keys); and b. a media type controller further comprising: i. a memory for housing a set of stored instructions regarding determining a desired media type to present for payment when multiple media types are present in a single standardized financial transaction card, ii. a processor in communication with the plurality of media sensors for implementing the stored instructions to determine the desired media type based on available media types on the standardized financial transaction card and the stored instructions and capable of communicating the desired media type to a payment controller.

As alluded to above, the various parts of the system are important in and of themselves. A user interface for a payment interface system comprises: a housing, a plurality of media sensors for sensing card data and media type, the plurality of media sensors each being selected to read a different media type, a singular card path for guiding a standardized financial transaction card having card data stored on at least one media type, each media sensor is positioned and located within the housing and along the singular card path such that user action of inserting a standardized financial transaction card into and along the singular card path places each media type present on the card in operative communication with a corresponding media sensor.

As noted above, the media sensors are selected from magnetic stripe readers, chip readers, chip and pin readers, contactless readers, prepaid card readers, RF readers, and near field communication (NFC) readers. In some embodiments, at least one of said plurality of media sensors is a contact or contactless reader positioned such that contact or contactless media may be read when in operative proximity of the housing without entering the single card slot and path. As shown throughout the figures, some embodiments provide a landing pad 210 against which or close to which the user may place the card (or other device) for contactless transactions. In some embodiments, standard or universal symbols can be used to inform the user of the location of the landing pad 210.

Figure 18:
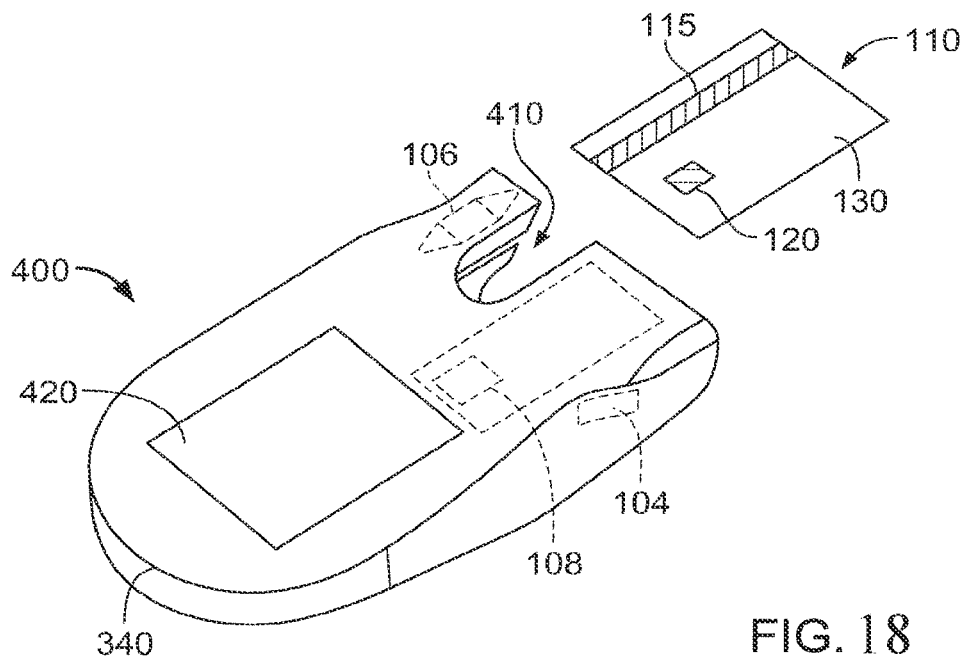
FIG. 18 illustrates a PRIOR ART exemplary integrated chip reader for use in accordance with some embodiments disclosed herein.
Figure 19:
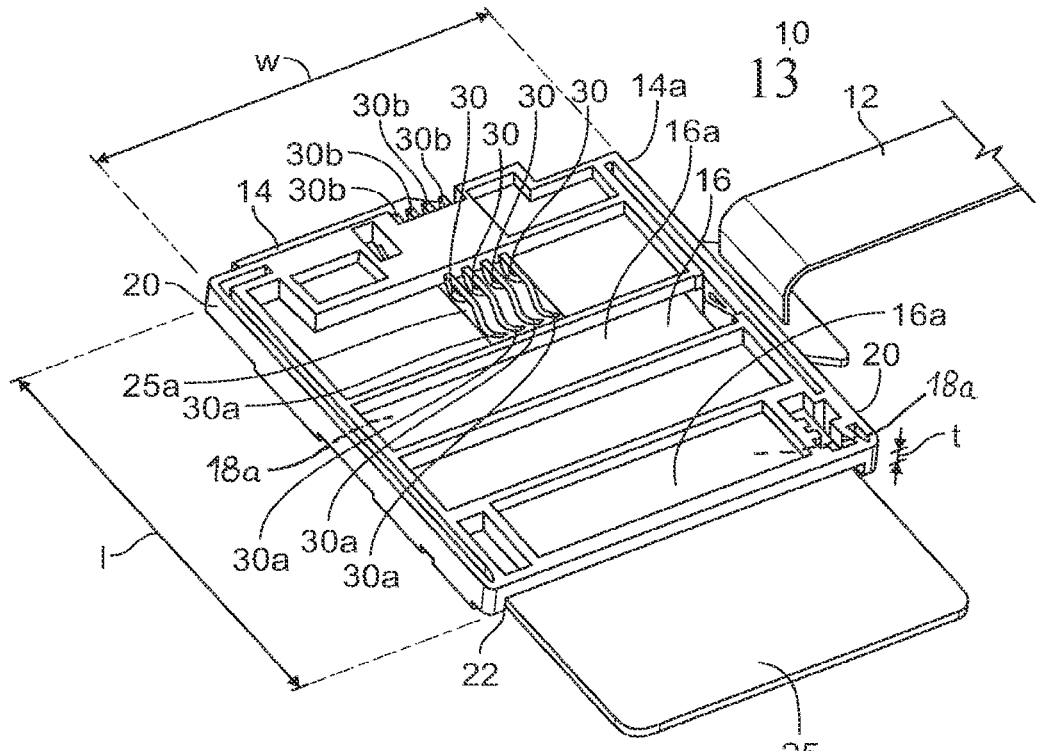
FIG. 19 illustrates exemplary PRIOR ART configurations of multiple media sensors arranged and configured in accordance with some embodiments disclosed herein.
Figure 20:
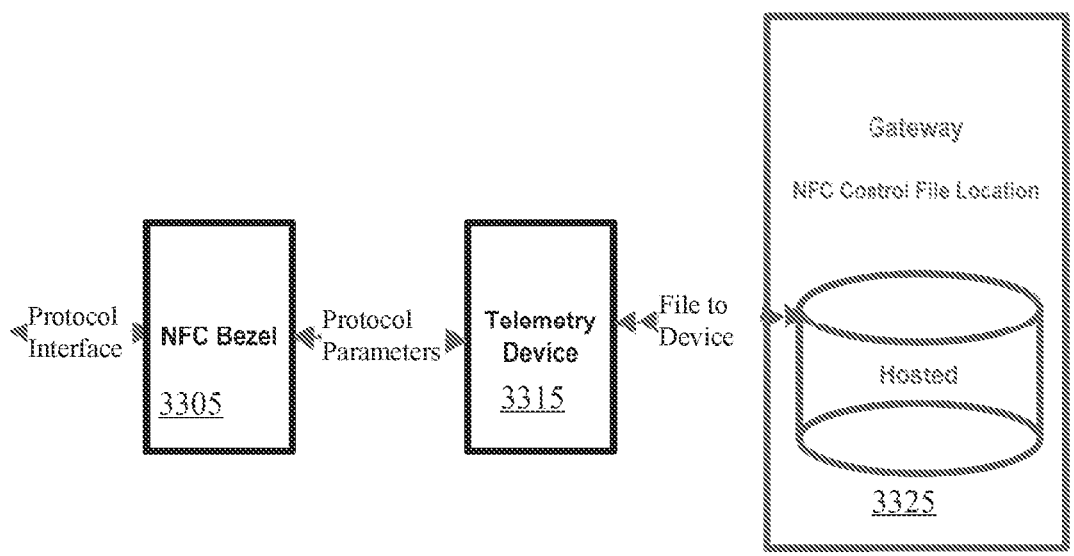
FIG. 20 is an example NFC network utilized in cashless transactions described herein.

With reference to the U.S. Pat. No. 8,875,994 and corresponding figures, FIGS. 13-18 of this disclosure illustrate an exemplary bezel or terminal (user interface) as disclosed herein. The bezel 100 includes a housing 110, which supports various media sensors (e.g. contact reader 100/600, 300; antenna 202, swipe reader 204), and defines a singular card path 300. The device, as shown, includes a bill acceptor 506 and defines a bill path that crosses the card path 300. The device also has a display 520, an interactive button 510, and a landing pad 210 for sensing contactless media on a card or other device. The card 600 is inserted into the card path 300 wherein upon insertion all media on the card can be read or sensed by the various sensors. With information passed on to the transaction type controller, as discussed elsewhere. FIGS. 13-19 show various views of an exemplary bezel as originally illustrated in U.S. Pat. No. 8,875,994 discussed above. FIGS. 18-19 show several embodiments of arrangements for the various readers and sensors. It should be noted that these may be modular in construction for ease of repair or replacement. It also should be noted that this arrangement is suitable for hand held or stand alone units as well as for implementation into larger machines (e.g. vending, gambling, bank, etc.)

Although the electronic data may come from any source, it is contemplated herein that in some embodiment, prior to receiving the electronic data, the method further comprises sensing, via a plurality of media sensors, data stored on a plurality of media types on the single standardized financial transaction card, said data including which media types are present; and outputting the data as electronic data to the processor. In some embodiments, the stored instructions comprise a hierarchical ranking of media types corresponding to the desired transaction type in an electronic form such as a database or other data structure.

An exemplary user interface, such as a bezel, is depicted throughout FIGS. 12-19. The drawings are meant to be illustrative only, other variants of the interface will be come readily apparent in light of the drawings and disclosure herein.

Throughout, it can be seen that the housing 110 provides support for various platforms which in turn support the media sensors. Importantly, inner portions 250 and 255, define a singular card path 300. The media sensors 104, 108, 202, 510 are placed strategically about the singular card path such that each media sensor is in a position complimentary to the standard position on a standardized financial transaction card for a particular media type.

The housing 110 encapsulates and secures the various parts either directly or indirectly. Inner portion 250 and 255 combine, among other things, to define a singular card path 300 denoted by the broad arrow. In this view, one can see a magnetic stripe reader 204, which is appropriately placed along the path in what would correspond to a magnetic stripe's position on a bank card. A display screen 520 and interface 510 are also shown. An RF loop 202 is provided as media sensor for RF and other contact/contactless operations. Additional media sensors 200 are appropriately located and housed in a compact but effective package. Various parts such as inner portion 250 also combine to form a bill acceptor.

The figures of this disclosure incorporate original figures from U.S. Pat. No. 8,875,994 simply to show some possible arrangements for various electronics, including additional media sensors. Depending on the sensors used, the particular space requirements of the vending machine, and other factors, the design, orientation, and layout could differ.

Referring now back to FIG. 1, an example of a system 101 in accordance with an embodiment of the disclosure is shown. Embodiments of the disclosure can provide systems and methods for electronic transaction auditing and accountability. In general, embodiments of the disclosure, such as system 101, can use one or more reconciliation tokens to track or otherwise mark any number of transactions handled by the system during communications between at least one server switch and one or more third party servers and/or a settlement engines. Other embodiments of the disclosure are described in FIGS. 2-6. Example methods associated with embodiments of the disclosure are described in FIGS. 7-11.

In the embodiment shown in FIG. 1, a system 101 can include one or more transaction devices 102A-N associated with respective vending equipment 104A-N. Some or all of the transaction-type devices 102A-N can be in communication via at least one network, such as 106, with one or more server switches, such as 108A-N. In one embodiment, one or more transaction-type devices 102A-N can be in communication with each other via one or more networks, such as 106.

Transaction-type devices 102A-N can be any processor-type device, and may be referred to individually as a data processing device. Some or all transaction-type devices 102A-N can be operable to receive and transmit data associated with at least one cash and/or cashless transaction, or a consumer. Such data may be referred to as transaction data. Transaction data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and any other type of data associated with a vending equipment transaction or a consumer. Examples of transaction-type devices can include, but are not limited to, a cash transaction reader, a cashless transaction reader, a combination cash and cashless transaction reader, a RFID reader, a biometric reader, an energy management system (EMS)-type device, a vending machine controller (VMC), and any other type of payment transaction devices. In some instances, a transaction device can be manufactured by HP™, DELL™, IBM/LENOVO™, and GATEWAY™, and may operate software provided by MICROSOFT™, and LINUX™.

In one embodiment, a transaction-type device, such as 102A, can be a payment device operable to accept a cash and/or cashless payment from a consumer, and further operable to facilitate the dispensing of goods and/or services from associated vending equipment, such as 104A. In another embodiment, a transaction-type device, such as 102A, can be a vending equipment controller operable to facilitate the operation of associated vending equipment, such as 104A.

Vending equipment 104A-N can include, but is not limited to, a product or beverage dispenser, a vending machine, a snack dispenser, a device capable of dispensing or providing a consumable food or drink item, a device capable of dispensing or providing a non-consumable item, or a device capable of facilitating purchase of a good and/or service. Vending equipment, such as 104A, can also be referred to individually as a vending machine. In some embodiments, vending equipment 104A-N may conform to vending industry standards including, but not limited to, the National Automatic Merchandising Association (NAMA) MDB specification, and the European Vending Association (EVA) DEX specification. In one embodiment, vending equipment 104A-N can include a vending industry standard-type multi-drop-bus (MDB) interface, and/or a data exchange (DEX) interface.

In one embodiment, multi-drop-bus (MDB) data can be collected from vending equipment, such as 104A-N, and the collected MDB data used to form transaction data records. In this regard, MDB data can include, but is not limited to, inventory, product pricing, and other data during vend events that can be combined with payment ID (for example a PIN number or credit card number) to form a transaction record. In addition, MDB data can be collected during non-vend events and used to form transaction records such as service requests, energy management records, and other types of transaction records.

In the embodiment shown in FIG. 1, a network 106 can be wired or wireless-type network, and may be more than one network to facilitate both wired and wireless-type communications between system components. The network 106 shown in FIG. 1 is shown by way of example Examples of a network 106 can include, but are not limited to, a local area network (LAN), a wide area network (WAN), the Internet, a global network, a wireless network, a wired network, and any combination thereof. Wireless network communications can be implemented, for example, by way of GSM, GPRS, CDMA2000, 1×RTT, EDGE, 802.11 types and kinds including but not limited to a, b, g, n, 900 MHz, 2.4 GHz, 5 GHz, spread spectrum, open wireless standards, proprietary wireless techniques, 3G, 3.5G, 4G technologies ('G' stands for generation), and any other wireless-type communication device, standard, or methodology. Wired network communications can be implemented, for example, by way of Ethernet, Firewire, serial communications, USB, RS232, and any other wired-type communication device, standard, or methodology. In one embodiment, a network can be the Internet, which may be referred to as a global network.

In the embodiment shown, a server switch 108A can be a processor-based platform, such as a server. In one embodiment, a server switch 108A can be operable to store a copy of some or all of transaction data received from one or more transaction devices 102A-N. The server switch 108A may store some or all of the transaction data in an associated database or data storage device, such as 110, 112, or 114. In another embodiment, a server switch, such as 108A, can be operable to generate a unique identifier, such as a reconciliation token, and associate the unique identifier or token with or otherwise add the unique identifier or token to a transaction record. In some embodiments, a server switch, such as 108A, can generate and associate a unique identifier or reconciliation token with some or all transactions which may be transmitted via a network, such as 106, by the system 100.

As shown in FIG. 1, the system 100 can also facilitate communications with one or more servers 116, 118, 122 and/or third parties 120. In the embodiment shown, some or all of the transaction-type devices 102A-N can be in communication with at least one of the following: a vend settlement server 116, a data services server 118, a financial institution 120, a third party server 122, and/or any device associated with a third party. In this embodiment, a transaction-type device, such as 102A, can transmit data via a network, such as 106, to a server switch, such as 108A. The server switch 108A can selectively transmit some or all of the received data to another transaction-type device, such as 102N; another server switch, such as 108N; a vend settlement server, such as 116; a data services server, such as 118; a financial institution, such as 120; a third party server, such as 122; or any other device associated with a third party. Data received by a vend settlement server 116, a data services server 118, a financial institution 120 and/or a third party server 122 can be stored in an associated database, such as 109, or other data storage device.

In one embodiment, a transaction-type device, such as 102A, can transmit data to a vend settlement server, such as 116, via a network, such as 106, and server switch, such as 108A. Data initially received or otherwise collected by the transaction-type device 102A can be transmitted to the server switch 108A in a format such as a data packet 124. The data can include, but is not limited to, vending equipment load-to-load (also referred to as fill-to-fill) information, vend transaction matching and reconciliation processing data, electronic fund transaction (EFT) reconciliation data, cash vending transactions, cashless vending transactions, cashless transaction data, cash transaction data, transaction records, DEX data, MDB data, transaction refunds (also referred to as reversals) data, accounting data, auditing data, electronic funds charge back data, route management data, business management data, and/or any other type of data associated with a vending equipment transaction or a consumer. Ultimately, some or all of the data can be transmitted by the server switch, such as 108A, to a vend settlement server, such as 116.

In one embodiment, one or more reconciliation tokens can facilitate auditing some or all of the transaction data handled by one or more vend settlement servers 116 and/or third party servers 122. For example, a server switch, such as 108A, can communicate at least one reconciliation token with each transaction to a vend settlement server 116 and/or third party server 122, and receive transaction data from the vend settlement server 116 and/or third party server 122 in response to each reconciliation token. In this example, a server switch 108A can transmit at least one reconciliation token in a data packet 126 to a vend settlement server 116 and/or third party server 122. In response to the receiving one or more reconciliation tokens, the vend settlement server 116 and/or third party server 122 can transmit a data packet 128 with response data including the one or more reconciliation tokens to the server switch 108A. Such response data can be compared to previously transmitted transaction data or other data previously stored in a database, such as 110, 112, or 114, or other data storage device associated with the server switch 108A. In one embodiment, a vend settlement server such as 116 can be referred to as a third party server and can be audited in a similar manner described above.

Furthermore, in one embodiment, a server switch, such as 108A, can be operable to switch or otherwise transfer one or more transaction records between various destination servers. For example, transaction data stored on a particular server can be transferred to another server by way of a server switch, such as 108A. Moreover, a server switch 108A can be operable to issue a data packet 130 with one or more reconciliation tokens in response to transaction data received or transmitted by the server switch 108A. In addition, a server switch 108A can be operable to maintain at least one transaction database for storing transaction data, such as a plurality of databases including a KO database 110, reconciliation database 112, and device database 114. In one embodiment, a server switch, such as 108A, can be operable to control access to a network, such as 106, by inspecting each transaction received at the server switch 108A. For example, before passing transaction data from a transaction-type device, such as 102A, to a destination location, the server switch 108A can check a database, such as the device database 114, to ensure that the transaction-type device, for instance 102A, from which the transaction is received is allowed to use the network 106. If the transaction-type device 102A is not allowed to use the network 106, the transaction data is not forwarded to the destination location and optionally the transaction-type device 102A can be informed by the server switch 108A that access to the network 106 is denied. In another embodiment, a server switch, such as 108A, can be operable to control the types or classes of transactions a particular transaction-type device, such as 102A, is allowed to transmit on a network, such as 106. In this regard, the server switch 108A can inspect the type or class of transaction being transmitted, compare each transaction type or class to one or more allowed types or classes of transactions stored in a database, such as device database 114, and determine if such a transaction is allowed from the particular transaction-type device 102A. For example, if a transaction-type device 102A is deployed to accept a particular class of transactions, such as hotel room key cards, the server switch 108A can prevent or otherwise limit all other transactions, such as non-hotel room key cards, from being used.

A big part of cashless transactions using card readers, such as the above described near field communication cards (NFC) includes credit and debit accounting and inventor control. Referring to FIG. 2, an example article comprising at least one program module 132 or set of computer-readable instructions operable to effectuate electronic transaction auditing of at least one vending machine in accordance with an embodiment of the disclosure is shown. In one embodiment, an article or at least one program module 132 can be implemented by a server switch or server, such as 108A or other suitable processor-based, computing, or client-type device.

In one embodiment, an article can be a program module or set of computer-readable instructions embodied in a computer-readable medium, such as software. For example, an article can be a program module such as an electronic transaction auditing program module 132 operable to be executed by at least one server switch or server, such as 108A. In this embodiment, the electronic transaction auditing program module 132 can generate at least one unique identifier associated with a respective transaction. The module 132 can also communicate the at least one unique identifier to a destination server, such as 134. In addition, the module 132 can receive from a destination server, such as 134, an electronic transaction and at least one unique identifier corresponding to the unique identifier previously communicated to the destination server 134 and associated with the respective transaction. Furthermore, the module 132 can compare the electronic transaction to data stored in a data storage device, such as 110, associated with the server, such as 108A. Moreover, the module 132 can audit the destination server, such as 134, based at least in part on the comparison.

A program module, such as an electronic transaction auditing program module 132, can be encoded in a variety of computer languages including, but not limited to, JAVA, PERL, PHP, PYTHON, C, C#, C++, VB.NET, VISUAL BASIC, scripting languages, assembler code, or any other type of programming language and or scripting language. A program module can be referred to, individually or collectively, as software, computer code, data, files, object files, or assembler code applications and can be embodied on any suitable machine readable medium. A machine readable medium can include, but is not limited to, a CDROM, DVD, a hard drive, a micro drive, flash memory, memory, a disk drive, a networked device, a data processing device, a data processing resource, and other types of computer-readable mediums. In one embodiment, various functions or code associated with a program module such as 132 could be distributed between multiple processing devices, such as server 108A and another server, or may reside in a single processing device, such as 108A.

The system 100 can be implemented using some or all of the system components shown in FIG. 25, and in this example, some of the system components of system are utilized. In this embodiment, the system can include a data flow which commence when a transaction-type device, such as 102A, can initiate communication with a third party server, such as 118, by way of server switch, such as 108A. For example, the transaction-type device 102A can generate and transmit at least one data packet, such as 124, which can include transaction data that can be encrypted such that a third party server, such as 118, can decrypt the data by way of at least one decryption key. In some instances, the encrypted transaction data can include other data, such as KO data, and can be further encrypted wherein the server switch 108A can decrypt the data by way of another decryption key. In any instance, the server switch 108A can receive the encrypted data, or data packet 124, and after processing the encrypted data or data packet 124, the sever switch 108A can transmit a corresponding data packet, such as 126, to the third party server 122. After receipt and processing of the data packet 126, the third party server 118 can transmit a corresponding data packet, such as 128, to the server switch 108A, wherein the server switch 108A decrypts and processes the data. Processing of the data by a server switch, such as 108A, can include some or all of the following activities: verifying that a transaction-type device, such as 102A, is authorized to access a network, such as 106; verifying that a transaction-type device, such as 102A, is authorized to perform a particular transaction type or class; generating at least one reconciliation token; and storing data, such as KO data, in a database or data storage device, such as 110, 112, and/or 114.

Referring back to the server switch, the server switch, such as 108A, can generate at least one data packet by either generating at least one new reconciliation token if a particular transaction requires it (such as when an initial authorization request is made) or identifying and/or retrieving a previously assigned reconciliation token (such as when a third party server 122 is communicating a response to transaction-type device, such as 102A). The data packet, for example 126, can include at least one reconciliation token and previously received third party or transaction data. In some instances, the previously received third party or transaction data can be encrypted if desired. The data packet 128 can be communicated to the third party server 122. Referring to the third party server, upon receipt of the data packet 126, the third party server, such as 122, can process the received data packet 126. Such processing can include, but is not limited to, decrypting the encrypted packet and acting on the data, or storing a reconciliation token and/or other associated transaction data in a database or data storage device, such as 110, 112, or 114.

During or after completion of processing the data packet 126 at the third party server 122, the third party server 122 can wait for a response to be communicated to transaction-type device 102A. In this regard, a data packet, such as 128, can be generated by the third party server 122 to include at least one previously received reconciliation token that was associated with the particular transaction at the server switch 108A, as well as response data from the third party server 122. In some instances, the response data from the third party server 122 can be encrypted if desired).

The third party server 122 can communicate the data packet 128 to the server switch 108A. The server switch 108A receiving the data packet 128 can use at least one reconciliation token to verify that a predefined transaction state sequence is being followed, and can update one or more state fields associated with the instant transaction. A "predefined state sequence" can be any combination of transaction states or steps in a particular sequence or order. The server switch 108A can update one or more databases as necessary, and/or otherwise process the received data packet 128. The server switch 108A can communicate a corresponding data packet 130 to the transaction-type device 102A. The data packet 130 can be received at the transaction-type device, such as 102A, where the transaction-type device 102A can process the data packet 130 and associated response data. In this example, data packets 124, 126, 128, and 130 can be of the same or similar format.

In one embodiment, a state machine data structure can be established by a server switch, such as 108A, for a particular class of transaction. In this regard, the server switch 108A can determine if a particular transaction-type device, such as 102A, is allowed to perform a particular class of transaction (for example, a hotel room key card-type-transaction) and prevent or otherwise limit the transaction-type device 102A from performing certain types of transactions (for example, RFID credit card-type transactions). Using state machine logic or a set of instructions, the server switch 108A can ensure that a prescribed sequence of communications between the transaction-type device 102A and the third party server 122 is maintained.

For example, when a transaction-type device, such as 102A, facilitates a sales or vending transaction at a vending machine, such as 104A, by way of a user paying with a credit card, a state of the transaction can be as follows. Initially, a first state can be recorded by a server switch, such as 108A, as an initial authorization request by the transaction-type device 102A. Another state can be a response to the initial authorization request by a third party server, such as 122. Yet another state can be a completed sales record communicated from the transaction-type device 102A when the user completes the sales or vending transaction. Another state can be when the third party server 122 acknowledges the receipt of the completed sales transaction record communicated from the transaction-type device 102A.

In this embodiment, the state tracking capability of a server switch, such as 108A, related to each class of transactions and for each individual transaction can permit the server switch 108A to provide accountability for some or all transactions. This can include, but is not limited to, tracking which transactions are in a particular state of processing, and instructing a transaction-type device, such as 102A, and an associated third party server, such as 122, to adhere to a predetermined sequence of communications (also referred to as "state machine type logic"). In the case where a transaction sequence is unsuitable or otherwise incorrect, a server switch, such as 108A, can stop or delay a particular transaction from proceeding and/or send a message to either or both the transaction-type device 102A and the third party server 122. This feature can permit the server switch 108A to maintain accountability of each transaction-type device 102A-N, each third party server, such as 122, and to also maintain oversight of the manner in which transaction-type devices, such as 102A-N, and an associated third party server, such as 122, communicate to perform certain classes of transactions.

One aspect of using one or more state conditions to monitor, control and/or track transactions is that at any time a server switch, such as 108A, can determine which transactions have been completed. In this regard, such information can be used, for example, to more accurately identify transactions that may appear to have been lost. Such transactions may have been authorized, but never settled, as such, the state of these missing transactions is that the transactions may only have been partially completed (no sales information, no settlement, no EFT, etc.). This aspect permits a user, via the server switch, such as 108A, to identify possible issues related to payment for products and/or services. In addition, the user can identify issues related to any number of transaction-type devices 102A-N, servers such as a third party server 122, and/or other issues related to transaction processing by the system 100.

Referring to FIG. 3, an example system 300 for auditing a third party server in accordance with an embodiment of the disclosure is shown. The system 300 can be implemented using some or all of the system components shown in FIG. 3, and in this example, some of the system components of system 100 are utilized. In the embodiment shown, one or more reconciliation tokens can be associated with a plurality of transactions, and some or all of the transactions and associated reconciliation tokens can be stored in one or more databases or data storage devices, such as databases 110, 112, 114. Auditing of a third party server, such as 122, can be facilitated by way of a server switch, such as 108A. In this regard, server switch 108A can communicate a data packet 126 including at least one reconciliation token or a group of data packets to one or more third party servers 122. Upon receipt of the data packet 126, the third party server 122 can respond by transmitting a data packet 128 including the at least one reconciliation token and associated response data, such as KO data, related to the transaction.

One aspect of using one or more reconciliation tokens to obtain transaction data from a third party server, such as 122, is that response transaction data can be compared to data stored in other databases or data storage devices, such as 110, 112, and/or 114 to check the validity, generate reports, and/or otherwise audit the third party server 122. This can ensure accountability of some or all transactions that may be handled by the network, and more specifically, can ensure the auditability and accountability of the transaction-type devices 102A-N and third party servers 122 which may process some or all of the transactions.

Referring to FIG. 4, an example system 400 for providing a vending network in accordance with an embodiment of the disclosure is shown. The system 400 can be implemented using some or all of the system components shown in FIG. 4, and in this example, some of the system components of system 100 are utilized.

In the embodiment shown in FIG. 4, a vend settlement server, such as 116, can provide some or all operational and financial data processing for an associated operator server, such as 134. An operational server can be operable to manage vending equipment, such as 104A-N, and/or one or more associated vending routes. The vend settlement server 116 can be operable to coordinate the reconciliation of coins, bills, cashless transactions, and other types of inventory management data. As shown, the vend settlement server 116 can communicate with the operator server 134. With data provided by the vend settlement server 116, the operator server 134 can provide route management for vending equipment, such as 104A-N, including, but not limited to, reporting, route management, accountability, service, financial management, business analysis, asset management, product inventory management, and data processing. In this regard, a vend settlement server such as 116 can be operable for money reconciliation, pre-cashless settlement processing (determining the revenue cashless transactions should produce), post settlement processing (determining the revenue actually received from cashless transaction processing—as an example from EFTs), and coordinate the delivery of funds, inventory, and other vending equipment data to an associated operator server such as 134.

In operation, the operator server 134 can communicate with the vend settlement server 116. Initially, transaction data from one or more transaction-type devices, such as 102A, and associated vending equipment, such as 104A, can be received or otherwise collected by the server switch 108A. The server switch 108A can communicate further as needed or desired with a data services server, such as 118 and/or a third party such as a financial institution 120. As discussed previously, transaction data can be communicated by the server switch 108A to the vend settlement server 116 for processing and/or storage. Optionally, a vend settlement server, such as 116, can utilize one or more databases to store data as may be required or desired, such as a transaction database 109. In any instance, the vend settlement server 116 can communicate with the operator server 134 to handle some or all of the following activities: reconciliation of coins, bills, cashless transactions, and other types of inventory management data; reporting; route management; transaction accountability; service; financial management; business analysis; asset management; product inventory management; data processing; money reconciliation; pre-cashless settlement processing (determining the revenue cashless transactions should produce); post settlement processing (determining the revenue actually received from cashless transaction processing—as an example from EFTs); and coordinate the delivery of funds, inventory, and other vending equipment data.

In this manner, reconciliation of bills, coins, and cashless transactions can be synchronized with the product or inventory that a route operators fills the vending equipment with, or otherwise restocks the vending equipment with. Delays in processing certain types of cashless transactions, such as credit card transactions, can result in less than 100% accountability of payment detail (bills, coins, and cashless revenues) at the time the route operator is restocking the vending equipment. As such, the ability to determine what has been sold and paid for can be difficult to determine at any given time and especially when cashless transactions are delayed by processing, such as pending electronic funds transfers (EFTs). In addition, the inability to accurately determine what has been purchased from the vending equipment can cause the route personnel to incorrectly select the restock product to load on to the route truck before traveling to the vending equipment location, which may cause too much or too little restock product to be carried on the route for subsequent restocking.

In FIG. 5, an example system 500 for providing a vending network in accordance with an embodiment of the disclosure is shown. The system 500 can be implemented using some or all of the system components shown in FIG. 5, and in this example, some of the system components of system 2800 are utilized. In the system shown, a server switch 108A can be in communication with a plurality of third party servers 122, such third party servers 122 utilizing a plurality of databases, such as transaction database 109. At least one of the third party servers 122 can be in communication with one or more financial institution servers 120, and by way of server switch 108A in communication with a plurality of transaction-type devices 102A-N. In this configuration, at least one third party server 122 can process transactions from the plurality of transaction-type devices 102A-N, and via server switch 108A can provide transaction level detail data and EFT level detail data to at least one vend settlement server 116, where such data is processed or otherwise reconciled with other data (non-cashless and other data) and then data communicated to the operator server 134.

In addition, optionally the server switch 108A can communicate with at least one financial institution server 120 and/or at least one data services server 118. In this regard, the server switch 108A can process transactions, providing as may be required and/or desired transaction level detail data, EFT level detail data, and/or other types of data or detail data to at least one vend settlement server 116, wherein the vend settlement server 116 with other data including data from at least one third party server 122 can process data and communicate as necessary with at least one operator server 134 to facilitate route management for vending equipment, such as 104A-N, including reporting, route management, accountability, service, financial management, business analysis, asset management, product inventory management, and data processing.

In the embodiment shown, a server switch, such as 108A can be in communication with one or more transaction-type devices, such as 102A-N, at least one vend settlement server 116, one or more third party servers 122, one or more financial institutions 120, and one or more data services servers 118. The transaction-type devices 102A-N can communicate different types of data, such data formatted in one or more data packets, to the server switch 108A. For example, a data packet 124 can include KO data and third party transaction data (encrypted if necessary). A second transaction-type device, such as 102B, may communicate formatted KO data illustrated as data packet 136. The flexibility of the server switch 108A to accommodate a plurality of different types of data, associated data packets, and data formats permits relevant data to be inspected and processed at the server switch 108A, such as KO data, as well as allow, if necessary, third party data (encrypted and/or otherwise proprietary) to be transmitted by the server switch 108A to a destination third party server, such as 122, and/or to a vend settlement server, such as 116.

An aspect of this embodiment is that collection of data from a plurality of transaction-type devices, such as 102A-N, at the server switch, such as 108A, can be relatively homogeneous across the plurality of devices, such as 102A-N. This can be implemented by some embodiments regardless of the type or purpose of the plurality of transaction-type devices. Another aspect of this embodiment is that oversight and accountability at the server switch, such as 108A and vend settlement server, such as 116, can be relatively easily maintained due in part to relatively homogenous data being received at the server switch 108A.

In another embodiment, an aspect is the ability for third party servers such as third party server 122 to receive data from the same transaction-type devices, such as 102A-N, in a format that allows the third party server 122 to continue operating as designed. In other words, transaction-type device, such as 102A, is operable to send a data packet (for instance, KO data and/or third party data) that can be both understood by the server switch, such as 108A, and by the third party server, such as 122. This permits both servers, the server switch 108A and the third party server 122, to function with minimal or no changes. This "shared data type function" can permit one or more third parties with their own information technology (IT) infrastructure, perhaps tailored to provide a particular product and/or service to their own customers, to use a vending network in accordance with an embodiment of the disclosure to both satisfy their third party data needs as well as satisfy needs of the server switch, such as 108A, a vend settlement server, such as 116, and/or an operator server, such as 134.

Another aspect of this embodiment can permit one or more third parties to provide various services to customers (web based and/or otherwise) from their own IT infrastructure while allowing a vending network in accordance with an embodiment of the disclosure, managed by the server switch, such as 108A, to maintain accountability, audit ability of the network, and utilize a vend settlement server, such as 116, to meet some or all of the needs of one or more vending route operators by way of an operator server, such as 134, and vending equipment personnel that may rely on the operator server 134 to operate or otherwise manage their respective businesses.

In one embodiment of a system for providing a vending network, as illustrated in FIG. 1, one or more databases, such as 109, 110, 112, and 114, or data storage devices can be associated with either or both a vend settlement server, such as 116, and/or the server switch, such as 108A. In one embodiment of a system for providing a vending network, as illustrated in FIG. 5, a vend settlement server, such as 116, can initiate an audit of a third party server, such as 122. In this regard, a vend settlement server, such as 116, can generate and transmit one or more reconciliation tokens to a third party server, such as 122, by way of transmitting a data packet to the third party server 122, and the vend settlement server 116 can receive a data packet including a response from the third party server 122.

Another embodiment of a system for providing a vending network can include a combination of servers, wherein a server originating an audit of a third party server, such as 122, can either be a server switch, such as 108A, or a vend settlement server, such as 116, and a data packet including a response from a third party server, such as 122, can be sent to a non-originating server, such as either the server switch 108A or a vend settlement server 116.

Referring to FIG. 6, an example system 600 for providing a vending network in accordance with an embodiment of the disclosure is shown. The system 600 can be implemented using some or all of the system components shown in FIG. 6, and in this example, some of the system components of system 600 are utilized. In this embodiment, the system 600 can include a plurality of server switches, such as 108A-N in communication with a plurality of transaction-type devices, such as 102A-N, and at least one vend settlement server, such as 116. The plurality of transaction-type devices 102A-C can utilize one or more of the plurality of server switches 108A-N to communicate with various data processing equipment, such as financial institution 120, the vend settlement server 116, and/or other third party servers, such as 122. The system embodiment shown can provide relatively flexible financial transaction handling and device network connectivity. In this manner, different transaction-type devices and server switches can be utilized to aggregate bills, coins, cashless, inventory, and/or other types and kinds of transaction data.

The flexibility and connectivity of the system embodiment shown can permit in some instances, certain cashless transactions to be processed where a sale amount is known but the actual funds are not yet available. For example, on occasion certain cashless transaction types, such as credit cards, may appear as a "good account" when authorized, but when it comes time to settle the transaction with the actual sale amount, the settlement process may sometimes fail. Such failures can occur for various reasons including the expiration of a credit card, an account being closed sometime after authorization but before settlement, and for many other reasons. In addition, there can be typically about a 24-72 hour delay from the time the settlement process occurs and the time the funds are actually available.

These circumstances, in combination with the fact that operators of vending equipment may need to synchronize coins, bills, and cashless transactions in a timely manner (often quicker then cashless funds are available) to facilitate route and inventory management, can provide a need to track cashless transactions in a pre-settled state, a post-settled state, and/or by EFT summary detail.

Pre-settled cashless transaction can be characterized as transactions that have been completed at vending equipment, such as 104A-N, and include a sale amount and any associated vend detail but still have to be communicated to a financial institution for settlement. Post-settled cashless transactions can be characterized as cashless transactions that have been communicated to a financial institution for settlement but funds may not be available. EFT summary detail can be characterized as the actual funds available that have been deposited (wired into a bank account).

In operation, there may be times when pre-settled cashless transaction details (sales that have not been settled) need to be combined with coins, and to reconcile vending equipment as well as to manage inventory. During other situations, post-settled cashless transaction detail may need to be relied upon, and finally EFTs may be reconciled to better manage the operator business. In one embodiment, the various states and conditions related to cashless transaction handling can be accommodated by the example system shown in FIG. 29.

As shown in FIG. 6, a financial institution, such as 120, can be in communication with at least one server switch, such as 108A-N, and at least one vend settlement server, such as 116. In this manner, the system 600 can handle various cashless transactions as well as provide a plurality of communication paths such that the server switches 108A-N and the vend settlement server 116 can synchronize some or all of the cashless transactions in a variety of states. The system 600 can also handle EFTs, coins, and bills, thus facilitating route management of vending equipment, products and service inventory, and/or financial accountability at an operator server, such as 134.

Referring to FIGS. 7 and 8, an example method of providing a vending network in accordance with an embodiment of the disclosure is shown. The method 700 can be performed using some or all of the system components shown in FIG. 1, and in this example, some of the system components of system 100 are utilized. In this embodiment, the method 700 can utilize at least one a server switch operable to generate one or more reconciliation tokens to administer transaction level accountability. In one embodiment, a server switch can receive transaction data and can assign one or more reconciliation tokens to the transaction data to uniquely identify and to track transactions processed or otherwise handled by a system and/or network. In this regard, when a transaction is originated, is the transaction can be assigned a unique reconciliation token by a server switch. Each successive communication referencing the same transaction can also reference the assigned reconciliation token. Embodiments of the method can permit data processing resources associated with a system and/or network to better track and monitor each transaction processed or otherwise handled by the system and/or network.

One aspect of assigning unique reconciliation tokens to each of the transactions permits a server switch and/or other data processing resources to perform transaction tracking, implement state machine logic to maintain proper transaction sequencing, audit data processing systems, and/or perform other data processing.

As described herein, an originating transaction can be any communication comprising transaction data that has not previously been assigned a reconciliation token. Such a transaction can be assigned at least one reconciliation token that can remain associated with the transaction and can be used to reference the transaction in any subsequent communications. For example, when an attempt to authorize a credit card transaction is made by a transaction-type device, such as 102A, a reconciliation token can be assigned to the transaction. When a corresponding sale is completed, the assigned reconciliation token can be part of the sale transaction record, and when settlement of the transaction is completed, the settlement transaction record can also include the same reconciliation token. At any time transaction history is called on, reviewed, or otherwise referenced, a particular transaction can be retrieved by any of various data processing resources associated with processing the transaction data by referencing the associated reconciliation token. Referring to FIGS. 7 and 8, the method 700 can include communications between at least one transaction-type device, such as 702A, at least one server switch, such as 708A, and a third party server, such as 722, and/or a vend settlement server, such as 716. The method 700 begins at block 702. In block 702, a transaction-type device, such as 102A, receives at least one transaction input and generates an originating transaction. In the embodiment shown in FIG.

7, transaction data associated with the originating transaction can be packaged or otherwise formatted in a data packet, such as KO data in a KO packet format with at least one unique transaction ID. In one embodiment, the transaction-type device, such as 102A, can encrypt some or all of the transaction data, KO data, KO packet format, and the unique transaction ID. The unique transaction ID data can be generated by the transaction-type device, such as 102A. A transaction input can include, but is not limited to, an instruction or command from a user to initiate a transaction, an instruction to purchase a product or service, a payment instruction, financial information, and other information associated with purchasing a product or a service.

Block 702 is followed by block 704.

In block 704, the transaction data is communicated to a server switch, such as 108A. In the embodiment shown in FIG. 7, the server switch, such as 108A, can be in communication with the transaction-type device, such as 102A, by way of at least one network, such as 106.

Block 704 is followed by block 706, in which the server switch, such as 108A, receives and, if necessary, decrypts the transaction data. Block 706 is followed by block 708, in which an identification (ID) associated with the transaction-type device, such as 102A, is checked. In one embodiment, an identification (ID) associated with the transaction-type device can be referred to as a terminal ID. For example, a terminal ID can be looked up in a database accessible by a server switch, such as 108A. If the identification (ID) associated with the transaction-type device, such as 102A, is not found in the database and/or the transaction-type device is not otherwise allowed to utilize a particular network, such as 106, then communications with the transaction-type device, such as 102A, ends and the method ends at block C. If the identification (ID) associated with the transaction-type device, such as 102A, and/or the transaction-type device is allowed to utilize a particular network, then the method 100 continues at block 710.

At block 710, a determination whether the transaction-type device is authorized to perform a predefined class of transactions. In this embodiment, KO data from the KO data packet can be used to determine if the transaction-type device, such as 102A, is authorized to perform a predefined or otherwise desired class of transactions. If the transaction-type device, such as 102A, is not allowed to perform the predefined or otherwise desired class of transactions, then an error message can be generated and the method 700 continues to block 712. If the transaction-type device, such as 102A, is authorized to perform the predefined or otherwise desired class of transactions, the method 700 can continue at block 716.

In one embodiment, a plurality of transaction types can be divided or otherwise organized into one or more classes of transactions. For example, a particular class of transactions can be for RFID credit card processing, and a transaction-type device, such as 102A, may be authorized to perform or otherwise accept only this class of transactions. As such, should a transaction be submitted to an associated server switch by a transaction-type device, wherein the transaction-type device attempts to authorize a hotel room key card, a class of transactions the transaction-type device may not be authorized to perform, an error can be generated and the transaction-type device can be prevented or otherwise limited from performing such a transaction. If, however, the transaction-type device submits an RFID credit card transaction, a class of transactions that the transaction-type device may be authorized to perform, the server switch may allow this transaction to proceed.

An aspect of an embodiment of the disclosure is the management and oversight by the server switch of the transaction-type device. In this regard, by authorizing a transaction-type device, such as 102A, to perform only certain classes of transactions, a server switch, such as 108A, can manage at the transaction-type device level, which classes of transactions the transaction-type device, such as 102A, is allowed to and not allowed to perform.

Referring to block 712, the server switch, such as 108A, can optionally generate and transmit a message back to the transaction-type device, such as 102A. For example, a message can include a "class not authorized" message and/or other error similar messages.

Block 712 is followed by block 714, in which the transaction-type device, such as 102A, receives the message, such as a "class not authorized" or error message. The method 700 ends at block C.

Referring to block 716, a transaction database is queried to determine whether the transaction is correct. In the embodiment shown, if the transaction already contains a reconciliation token (that is it is not an originating type of communication) then a transaction database, such as 109, is queried and the transaction located using the transaction's existing reconciliation token. The state of the transaction is checked against transaction data stored in the transaction database, such as 109, to determine if the sequence of the transaction is correct.

In one embodiment, one or more classes of transactions can have a respective prescribed sequence of transactions that are associated with each class or otherwise need to be performed as part of the class. For example, a class of credit card transactions can include an authorization request, a sales complete notification, and a settlement transaction. As such, the authorization request should take place first, the sales complete notification second, and the settlement transaction third. If a transaction is authorized and then a settlement attempt is made (without the sales complete notification step occurring) the transaction is "out of sequence", and the server switch, such as 108A, implementing state machine type logic or another set of instructions can detect the out of sequence transaction and prevent or otherwise limit the out of sequence step from occurring instead issuing an "out of sequence error".

Referring back to block 716, if the server switch, such as 108A, determines that the transaction is out of sequence then the method 700 continues at block 718. If the determination is that the transaction is in sequence or the transaction has not been assigned a reconciliation token (the transaction is an originating transaction) then the method 700 continues at block 724 in FIG. 8.

Referring to block 718, an error message can optionally be sent to the transaction-type device, such as 702A. In one embodiment, an error message can be an "out of sequence" message and/or other type of error message. The method 700 ends at block C.

Referring to block 724 in FIG. 8, a reconciliation token can be generated for the current originating transaction and the transaction data can be stored in a transaction database. In this embodiment, the server switch, such as 108A, can generate and associate a reconciliation token with the transaction data, such as KO data. The transaction data and associated reconciliation token can be stored by the server switch, such as 108A, in an associated database or data storage device, such as transaction database 109.

Block 724 is followed by block 726, in which the reconciliation token and transaction data can be transmitted to a third party server, such as 122, or to a vend settlement server, such as 116. In this embodiment, the server switch, such as 108A, can transmit the reconciliation token and transaction data, such as KO data, in a data package or data packet, and transmit the data package or data packet to the appropriate third party server, such as 122, or a vend settlement server, such as 716.

An aspect of an embodiment of the disclosure for having a server switch, such as 108A, generate unique reconciliation tokens is that duplicate transactions can be avoided. In this manner, one component of the system can generate and issue reconciliation tokens instead of relying on transaction IDs generated by a transaction-type device, such as 102A, and/or other servers. A drawback of conventional vending systems and networks is that third party servers and/or transaction-type devices can vary by type and manufacture, and in how transaction IDs may be generated, and as such, may not be relied upon from an accountability and/or auditing standpoint. By providing a server switch, such as 108A, operable to assign and associate one or more reconciliation tokens to transaction data as well as manage transaction level state machine type logic for each class of transactions can ensure that transactions can be uniquely identified, audited, and prescribed to a predefined or otherwise desired transaction sequencing.

Block 726 is followed by block 728, in which the transaction data is decrypted if necessary, and processed by a third party server, such as 122, or by a vend settlement server, such as 116. In this embodiment, a third party server, such as 122, or a vend settlement server, such as 116, can receive the transaction data from the server switch, such as 108A. The transaction data can be decrypted if necessary, and the transaction data, such as the KO data and associated reconciliation token can be processed by the third party server, such as 122, or a vend settlement server, such as 116. Such processing can include, but is not limited to, associating the reconciliation token with the transaction if necessary.

Block 728 is followed by block 730, in which a response is generated and transmitted with the reconciliation token by the third party server, such as 122, or by a vend settlement server, such as 116. In this embodiment, the third party server, such as 122, or vend settlement server, such as 116, can encrypt as necessary a response, such as response data, in a response data packet including the corresponding reconciliation token. The response data packet can be transmitted to the server switch, such as 108A.

Block 730 is followed by block 732, in which the response data packet can be decrypted if necessary by the server switch, such as 108A, and the response data checked for a correct transaction sequence. In this embodiment, the server switch, such as 108A, can determine the state of the transaction associated with the reconciliation token and compare the state of the transaction with previously stored data in an associated database or data storage device, such as a transaction database 109.

Block 732 is followed by block 720 in FIG. 7, in which a response from the third party server, such as 122, or a vend settlement server, such as 116, is communicated from the receiving server switch, such as 108A, to the transaction-type device, such as 102A, which initiated the originating transaction. In this embodiment, response data is transmitted from the third party server, such as 122, or a vend settlement server, such as 116, via the receiving server switch, such as 108A, to the transaction-type device, such as 102A.

Block 720 is followed by block 722, in which the transaction-type device, such as 102A, receives the response. In this embodiment, the transaction-type device, such as 102A, which initiated the originating transaction can receive the response and associated response data, and the transaction-type device, such as 102A, can process the response and response data as needed. The method 700 ends after block 722.

Figure 9:
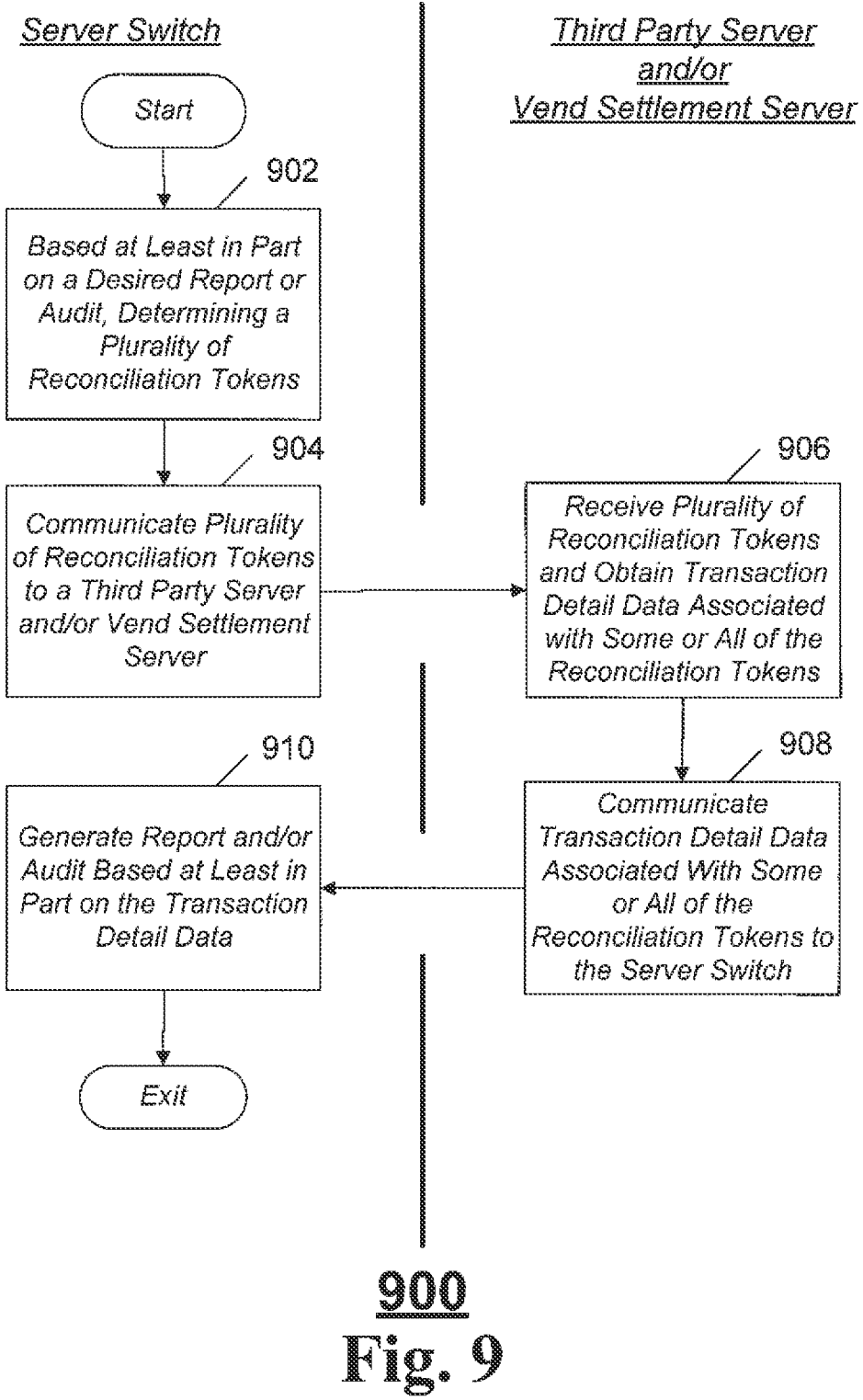
FIG. 9 illustrates an example method of using one or more reconciliation tokens to generate reports and/or audit server switch, third party servers, and/or vend settlement servers in accordance with an embodiment of the disclosure.

Referring to FIG. 9, an example method of using at least one reconciliation token to generate a report in accordance with an embodiment of the disclosure is shown. The method 900 can be performed using some or all of the system components shown in FIG. 1, and in this example, some of the system components of system 101 are utilized. In this embodiment, the method 900 can utilize at least one server switch, such as 108A, in communication with one or more third party servers, such as 122 and/or vend settlement servers, such as 116. In one embodiment, a server switch, such as 108A, can be operable to generate reports, audit a server by determining a plurality of reconciliation tokens, communicating the plurality of reconciliation tokens to one or more servers of interest, and receiving transaction detail data wherein the transaction detail data corresponds to transactions associated with the plurality of reconciliation tokens communicated to the one or more servers. For example, if a report or audit is desired to be generated for some or all transactions transacted on Jan. 22, 2007, a query by a server switch, such as 108A, of one or more third party servers, such as 122, can be performed to determine a plurality of reconciliation tokens associated with some or all transactions transacted on Jan. 22, 2007.

In one embodiment, a server switch, such as 108A, can process communications between a plurality of transaction-type devices, such as 102A-N, and one or more third party servers, such as 122. During the processing of communications, the server switch, such as 108A, can assign a unique reconciliation token to each transaction, manage various transaction states associated with each transaction, and store transaction detail data in an associated database or data storage device, such as transaction database 109.

To generate a report or to audit a third party server, such as 122, a plurality of reconciliation tokens queried by a server switch, such as 108A, can be communicated to a third party server, such as 122. In response to receiving the plurality of reconciliation tokens, the third party server, such as 122, can respond by communicating to the server switch, such as 108A, transaction detail data associated with each of the plurality of reconciliation tokens. The server switch, such as 108A, can compare the transaction detail data provided by the third party server, such as 122, to the transaction detail data or other data accessible to the server switch, such as 108A, by way of an associated database or data storage device, such as transaction database, such as 109, to check for correctness, identify any anomalies, perform data processing, and/or generate a report or audit of the third party server, such as 122.

In at least one embodiment, reports or audits can be generated by a plurality of server switches, such as 108A-N. In such embodiments, the plurality of server switches can be in communication with one or more third party servers, such as 122, vend settlement servers, such as 116, and/or on other data processing resources.

Referring to FIG. 7, the method 700 can include communications between a server switch, such as 108A, and one or more third party servers, such as 122, and/or vend settlement servers, such as 116. The method 700 begins at block 702, in which based in part on a desired report and/or audit, a plurality of reconciliation tokens can be determined by a server switch, such as 108A. In this embodiment, a server switch, such as 108A, can generate one or more reconciliation tokens for each transaction a report and/or audit is desired for.

Block 702 is followed by block 704, in which the plurality of reconciliation tokens can be communicated from the server switch, such as 108A, to a third party server, such as 122, and/or vend settlement server, such as 116. In this embodiment, the server switch, such as 108A, can transmit the plurality of reconciliation tokens to at least one third party server, such as 122, and/or vend settlement server, such as 116.

Block 704 is followed by block 706, in which the third party server, such as 122, and/or vend settlement server, such as 116, can receive the plurality of reconciliation tokens, and can obtain transaction detail data associated with some or all of the plurality of reconciliation tokens. In this embodiment, a third party server such as 122, and/or vend settlement server, such as 116, can query a database or other data storage device, such as a transaction database 109, using some or all of the plurality of reconciliation tokens to obtain corresponding transaction detail data associated with some or all of the plurality of reconciliation tokens.

Block 706 is followed by block 708, in which the transaction detail data associated with some or all of the plurality of reconciliation tokens can be communicated to the server switch, such as 108A. In this embodiment, the third party server such as 122, and/or vend settlement server, such as 116, can transmit corresponding transaction detail data associated with some or all of the plurality of reconciliation tokens to the server switch, such as 108A.

Block 708 is followed by block 710, in which a report and/or audit is generated based at least in part on the transaction detail data received from the third party server, such as 122, and/or vend settlement server, such as 116. In this embodiment, the server switch 108A, can generate at least one report and/or audit based at least in part on the transaction detail data received from the third party server, such as 122, and/or vend settlement server, such as 116. In one embodiment, a report and/or audit can include a predefined format in accordance with generally accepted procedures, standards, or techniques. After block 710, the method 700 ends.

Figure 10:
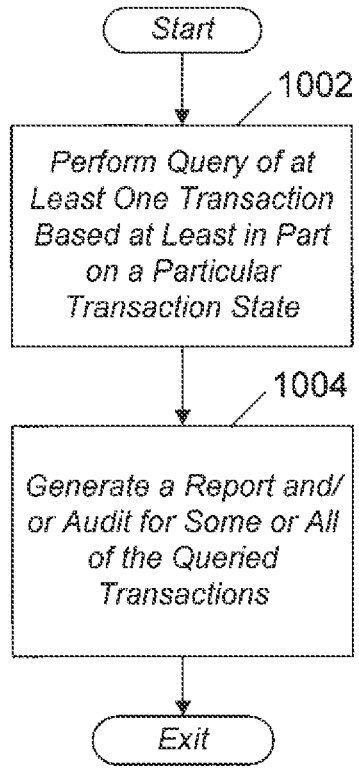
FIG. 10 illustrates an example method of using one or more transaction states to generate reports and/or audit server switch, third party servers, and/or vend settlement servers in accordance with an embodiment of the disclosure.

Referring to FIG. 10, an example method of using transaction states to generate a report and/or audit in accordance with an embodiment of the disclosure is shown. The method 1000 can be performed using some or all of the system components shown in FIG. 1, and in this example, some of the system components of system 101 are utilized. In this embodiment, the method 1000 can utilize at least one server switch, such as 108A, one or more third party servers, such as 122, and/or one or more vend settlement servers, such as 116. In one embodiment, at least one server switch, such as 108A, can manage communications between a plurality of transaction-type devices, such as 102A-N, and a plurality of servers, such as 116 and/or 122. The server switch, such as 108A, can prescribe that some or all classes of transactions have multiple steps, and can manage one or more transactions to adhere to state machine logic or another set of instructions. For example, a credit card class of transactions can include, but may not be limited to, an authorization request from a transaction-type device, such as 102A, to a third party server, such as 122; an approval response from the third party server, such as 122, back to the transaction-type device, such as 102A; a sale complete notification from the transaction-type device, such as 102A, to the third party server, such as 122; a sale complete acknowledgement from the third party server, such as 122 to the transaction-type device, such as 102A; a settlement record (pre-settlement) from the third party server, such as 122, to a vend settlement server, such as 116; and an EFT notification (post-settlement) from the third party server, such as 122, to the vend settlement server, such as 116.

Some or all of these communications can be handled and processed through a server switch, such as 108A. In addition, the server switch, such as 108A, can assign at least one unique reconciliation token to each respective transaction. The reconciliation tokens can be coupled with a state field to track each transaction and enforce a predefined sequence of transaction steps that each class of transaction can follow. One aspect of an embodiment of the disclosure is that a server switch, such as 108A, can enforce a predefined sequence of transaction steps to follow for each class of transactions (for example, transaction steps for a class of credit card transactions), and at any time, the server switch, such as 108A, can use some or all of the states associated with each transaction to report or audit transactions at various points in the transaction, from the originating transaction to the completion of the transaction.

For example, in the credit card processing transaction example above, a report or audit can determine which transactions were authorized but no sale complete notification information has been communicated. In another example, a report or audit can determine which transactions were in at least a sale complete state but no EFT confirmation transaction has yet been received. These types of reports and audits can be used to ensure some or all transactions can be accounted for and are otherwise not missing or incomplete.

Referring to FIG. 10, the method 1000 can include communications between a server switch, such as 108A, and one or more third party servers, such as 122, and/or vend settlement servers, such as 116. The method 1000 begins in block 1002.

In block 1002, a query of at least one transaction is performed based at least in part on a particular state. In this embodiment, a server switch, such as 108A, can query a database or data storage device, such as a transaction database 109, for at least one transaction based at least in part on an associated transaction state. For example, an associated transaction state can be where all transactions are sale complete. In another example, an associated transaction state can be a particular criteria associated with one or more transaction states, such as at least sale complete state but no EFT notification.

Block 1002 is followed by block 1004, in which a report and/or audit can be generated for some or all of the queried transactions. In this embodiment, the server switch, such as 108A, can produce or otherwise generate a report on some or all transactions queried in the database or data storage device, such as transaction database 109. In another embodiment, the server switch, such as 108A, can perform an audit and associated report for some or all of the transactions queried in the database or data storage device, such as transaction database 109. The method 1000 ends after block 1004.

Figure 11:
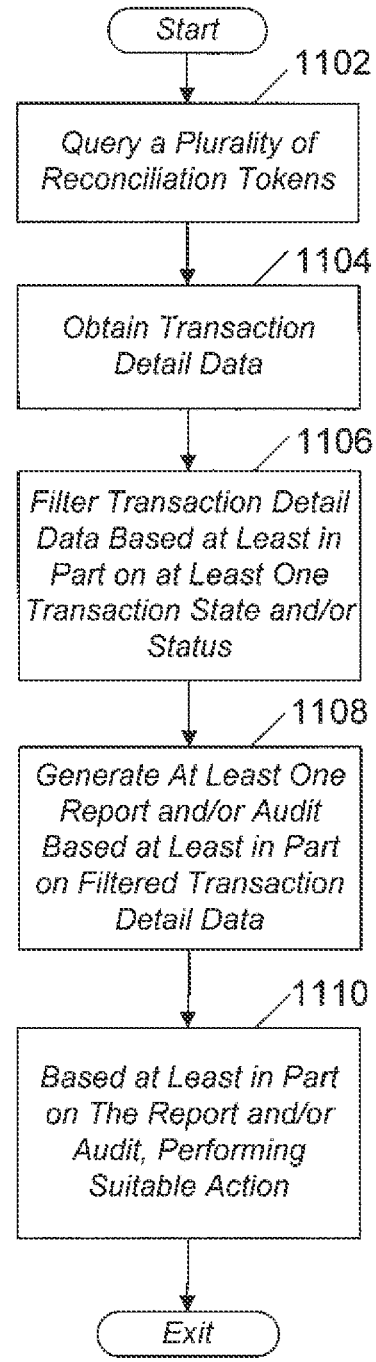
FIG. 11 illustrates an example method of using one or more reconciliation tokens and transaction states to generate reports and/or audit server switch, third party servers, and/or vend settlement servers in accordance with an embodiment of the disclosure.

Referring to FIG. 11, an example method of using reconciliation tokens and transaction states to generate a report and/or audit in accordance with an embodiment of the disclosure is shown. The method 1100 can be performed using some or all of the system components shown in FIG. 1, and in this example, some of the system components of system 101 are utilized. In this embodiment, the method 1100 can utilize at least one server switch, such as 108A, one or more third party servers, such as 122, and/or one or more vend settlement servers, such as 116. In one embodiment, a database or other data storage device, such as transaction database 109, can be accessible to a server switch, such as 108A, and can be populated with one or more transactions processed or otherwise handled by a server switch, such as 108A, one or more transaction-type devices, such as 102A-N, third party servers, such as 122, and/or vend settlement servers, such as 116.

As such, an aspect of an embodiment of the disclosure is to query a plurality of reconciliation tokens associated with a particular transaction state and/or other report or audit criteria, and communicate the plurality of reconciliation tokens to one or more third party servers and/or vend settlement servers. In this regard, some or all of the receiving servers can query some or all of the transaction detail data associated with each of the plurality of reconciliation tokens, and respond by sending transaction detail data to a requesting server switch, such as 108A. The server switch, such as 108A, can compare the transaction detail data to data previously stored in an associated database or data storage device, such as a transaction database 109, accessible to the server switch, such as 108A, wherein one or more reports and/or audits can be generated. Such reports and audits can be performed to ensure that one or more third party servers, such as 122, and vend settlement servers, such as 116, are accurate and otherwise ensure accountability of the transaction data being processed or otherwise handled by the system and/or network in accordance with an embodiment of the disclosure.

In one embodiment, a method of using reconciliation tokens to generate a report and/or audit across a plurality of servers can be implemented. In this example embodiment, some or all of the plurality of servers can encompass at least one geography, brand/or company product, and/or at least one marketing, sales, and/or business reason.

Referring to FIG. 11 the method 1100 begins in block 1102.

In block 1102, a plurality of reconciliation tokens is queried. In this embodiment, a plurality of reconciliation tokens can be queried by at least on server switch, such as 108A. Results of the query can be used to generate at least one report and/or audit.

Block 1102 is followed by block 1104, in which transaction detail data is obtained. In this embodiment, the server switch, such as 108A, can obtain transaction detail data from one or more third party servers, such as 122, and/or vend settlement servers, such as 116. For example, the server switch, such as 108A, communicating a plurality of reconciliation tokens to one or more third party servers, such as 122, and/or vend settlement servers, such as 116, and obtain transaction detail data in response to some or all of the plurality of reconciliation tokens.

Block 1104 is followed by block 1106, in which the transaction detail data is filtered based at least in part on at least one transaction state and/or status. In this embodiment, the server switch, such as 108A, can filter transaction data details received in response. A suitable filter can be based at least in part on particular transaction detail data, at least one transaction state, at least one transaction status, other data, or any combination thereof.

Block 1106 is followed by block 1108, in which at least one report and/or audit is generated based at least in part on the filtered transaction detail data. In this embodiment, the server switch, such as 108A, can generate at least one report and/or audit based at least in part on filtered transaction detail data.

Block 1108 is followed by block 1110, in which based at least in part on the report and/or audit suitable actions can be taken. In one embodiment, for example, should an audit reveal or otherwise yield an anomaly in the transaction, the anomaly can be addressed by further action, data processing, and/or other actions as needed or desired. The method 1100 ends after block 1110.

All of the above noted technology may be implemented for use with NFC cards and card readers installed in a vending machine environment. In one example implementation, the vending machine includes a computerized bezel connected to a processor and computer memory storing software to implement an interface protocol for NFC card transactions with a vending machine. The software may include protocol instructions that incorporate variables that can be completed with vending parameters as shown in FIGS. 20-23. In this example, the computerized bezel can store universal interface software for enabling cashless transactions, and a control file stored separately may provide vending parameters to complete those variables at the computerized bezel. In this way, the overall vending machine can be delivered to a business location, connected to a network, and the vending parameters necessary to complete the machine implementation can be stored in a control file. The vending parameters may be organized by a universally recognized template, or data structure, so that the software at the computerized bezel can extract the vending parameters over the network. The control file may be organized for different vendors, different OEMs, different protocols, and different variables all accessible from a single location.

One embodiment of this disclosure also describes the system, methods, and computer readable media that can be configured to implement near field communications with bezel interfaces for cashless terminals. One embodiment is implemented for the device manufacturers to be able to interface to other NFC protocols other than the normal bankcard NFC and phone interfaces. (e.g., ApplePay, GooglePay and others). A control file is needed due to the fact that many business locations (e.g., college campuses) use the same NFC interface for payments and other purposes such as security entrances installed on a card, referred to above as a transaction type device 2402 and also referred to as a customer device. For example, in a college environment example, a student will pay for his lunch with a card and open the door to their dorm building with the same card. The card may be configured with one or more NFC tag circuits for different applications. Also, there are numerous NFC Protocols that the campuses use.

In one embodiment of this disclosure, there may be several NFC Protocols supported (Mifare Classic, Desfire, etc.) by a vending machine and a corresponding transaction type device/customer device. Many have different address locations on the card to read the students card number. Some of the card numbers are encrypted for security. So a key will be supplied to decrypt the cards.

In one set-up, the above described servers used in cashless transactions between a customer and a vending machine may take numerous forms. In one embodiment, at least one of the servers 108 is a gateway server that is configured for use with vending networks 106. For example, an OEM may provide vending machines and associated inventory for purchase with cashless transaction cards. The gateway computer 106 operated by that OEM may connect to dozens, hundreds, or more vending machines that are equipped with communications abilities (wired or wireless) to communicate with the gateway over a network. OEM providers may have a different implementation for the same protocol. So there will be an NFC control file definition for each OEM that is installed at a business location. This disclosure removes the requirement that each of these vending machines at each business location be configured by personnel visiting the machine. One embodiment of this disclosure provides for all of the configuration data necessary to set up a computerized bezel for commercial transactions be stored in part at the bezel and in part in a control file stored remotely from the vending machines. As shown in FIG. 33, the control file will be made available over a network 106 and can provide vending parameters that are necessary to "complete" or "configure" an interface protocol 3305 at the bezel. A telemetry device 3315 connected to the vending machine provides network connectivity and data communications over the network to a gateway computer 3325. The control file may be stored in the gateway computer for easy remote access by all vending machines on the network. In one embodiment, the control file stores the appropriate data for completing an interface protocol in one file that is divided into sections for various protocols, locations, or OEM vendors. If necessary for special applications, however, the sections could be separated and stored in separate control files. The vending parameters simply need to be accessible by a vending machine connected to the network.

The control file of this disclosure may be described with numerous functions, including:
1. Create a control file that manages the different NFC card interfaces that business locations (e.g., college campuses/schools) use for payment instruments.
2. Enable acceptance of such college campus school cards for payments.
3. Make the control file flexible and easy to use for all the campuses needed.
4. Enable most of the currently used NFC Protocols.
5. Allow for the addition of new NFC Protocols.
6. The device will also report the loaded file in the terminal condition report after the bezel version following a semicolon.

The name of the NFC control file that will be used will be stored in the parameters going to the telemeter from the gateway computer. For example, and without limitation, CS10 will be used for the file name temporarily until the permanent parameter name CF01 is available. In some embodiments, terminals configured in the bezels of a vending machine are grouped by the Credit To Number scheme. The NFC control file will be defined by Credit To number. And the NFC file will be enabled during a terminal add with that Credit To number.

The file name will be passed up with an ICGN parameter CS10/CF01. The file will live in the OEM FTP directory location under the Campus Control Directory. The file will be read and applied to the bezel for that Campus Cards acceptance. The file will be reported in the Terminal Condition Report if successfully loaded. In the same field as the Bezel firmware version with the file name following a ";". The application of the file to the bezel will be identified with the file name and a status. The status being good; error; or not found. An error identifier and be placed after the word error if the application is able to do so. See appendix E for error conditions and reporting.

In the file will contain each OEM and the list of values, referred to as vending parameters 3405, 3505, shown in FIGS. 34-36, needed to accept a NFC communications tap. For Example for the University of Washington where both CAI and MEI devices are installed there would be a sections for each OEM. Or there could be an individual file for each.

The card number retrieve will be formatted into track 2 and sent up for authorization. The format will be sent up as it is today.

There are a various number of protocols and within each protocol many versions. In the case of MiFare and HID. Only the most common protocols between schools will be accepted and tested.

There will be a section in each file for each OEM firmware This is the file format of the NFC Control File using the Jason Message structuring scheme.

TABLE 2

| Data Element Name | Description | Values | Required |
|---|---|---|---|
| School Name | Name of the school this is used for. | String Data | Yes |
| Notes | Any Comments or Notes needed to be stored for reference. | String Data | Optional |
| Enable | The type of Protocol to Enable | Classic Desfire ApitiQ | Yes |
| OEM | This is for the section | CAI or MEI or any new supplier | Yes |
| Values Defined for the OEM | | | |

The control file of FIGS. 34-36 may be described as a non-transitory computer readable medium (CRM) for configuring a near field communication vending machine, the non-transitory. Typically, a control file stored will be stored in computerized memory on a computer on a network connected to vending machines as described herein. The control file may be configured with at least one universal configuration template organizing vending parameters 3405, 3505 in a pattern of software commands, wherein the vending parameters are selected to complete an interface protocol 3305 that enables the NFC vending machine to accept a request by a customer payment device, such as an NFC enabled card (i.e., the transaction type device 102). The vending parameters enable the NFC vending machine to consummate a vending transaction initiated by an NFC tap from a customer payment device (i.e., a transaction type device). In one non-limiting embodiment, the control file is stored on a gateway computer connected to the NFC vending machine over a communications network. The control file is stored on the gateway computer positioned at a location that is remote from the NFC vending machine.

In one non-limiting embodiment, the control file may include a plurality of the configuration templates organized in sections of the control file. The sections correspond to respective OEM vending equipment grouped at a business location, such as a college campus in one example. The vending parameters are stored in a JSON message structure. The vending parameters are selected to match a respective NFC protocol used at a set of vending machines. The vending parameters are selected to match at least one of a several implementations of an NFC protocol. In one embodiment, the control file resides on a gateway computer in an file transfer protocol (FTP) directory.

Using the above described control file, embodiments of this disclosure implement a system for consummating purchase transactions with an NFC vending machine. The system may include a a gateway computer connected to a plurality of NFC vending machines over a network. A computerized bezel connected to the NFC vending machine, and the computerized bezel is in communication with a processor and memory storing an NFC protocol that enables the NFC vending machine to accept a request to pay for a selected product by a customer payment device. A telemeter may be installed in the vending machine and in data communication with the computerized bezel and the gateway computer. The control file stored on the gateway computer can be configured with at least one universal configuration template organizing vending parameters in a pattern of software commands, wherein the vending parameters are set to complete the interface protocol stored in the computerized bezel and enable vending with a customer payment device.

In this embodiment, the control file further includes a plurality of the configuration templates organized in sections of the control file. The sections of the control file correspond to respective OEM vending equipment grouped at a plurality of installation sites. The interface protocol at the computerized bezel comprises payment software that is configured by the vending parameters stored in the NFC control file. The interface protocol at the computerized bezel may include a data structure for storing an encryption key received from the NFC control file that enables vending payment with the customer payment device. The data structure of the interface protocol is configured to retrieve customer data from the customer payment device. The customer payment device includes data memory on a portable card that is divided into segments and blocks for storing the customer data by data types.

The computerized bezel and the interface protocol originate with an original equipment manufacturer (OEM), and the control file comprises a plurality of sections corresponding to a respective universal configuration template for the OEM.

The developments described herein are used to enable a computer implemented method of configuring near field communication vending machines connected on a network. By storing at least one universal configuration template in an NFC control file on a gateway computer connected to the network, the universal configuration template organizes vending parameters in a pattern of software commands, wherein the vending parameters are set to activate an interface protocol stored in a computerized bezel that enables vending with a customer payment device. The method includes establishing electronic communication between the computerized bezel and the gateway computer over the network. For respective computerized bezels corresponding to respective OEMs, the method and system for this disclosure identify the universal configuration template in the NFC control file that corresponds to the respective OEM. The method proceeds by the computerized bezel downloading to the computerized bezel the vending parameters corresponding to the respective OEM and a respective business location at which the NFC vending machine is installed. In order to ensure that the computerized bezel remains up to date and able to communicate properly with NFC cards, customer payment devices, and interaction type devices, the computerized bezel periodically initiates communications from the NFC vending machine to the gateway computer to check for updates in the control file and download the updates to the computerized bezel.

According to this disclosure, an NFC card, tag, smart device, or the like are configured for consummating vending transactions between the computerized bezel and the customer payment device, wherein the computerized bezel is further connected over the network to outlet vending software stored on the gateway, the outlet vending software tracking the transactions according to outlet terminal ID and card acceptor ID. The processes described above allow for similar tracking of transactions with the outlet vending software according to profit center number and sales center name coded into the card acceptor ID.

The capabilities of various embodiments of the disclosure can be implemented in software, firmware, hardware or some combination thereof. As one example, one or more aspects of embodiments of the disclosure can be implemented in an article of manufacture (e.g., one or more computer program products) having, for instance, computer usable media. The media has embodied therein, for instance, computer readable program code as a means for providing and facilitating the capabilities of embodiments of the disclosure. The article of manufacture can be included as a part of a computer system or sold separately.

Additionally, at least one program storage device readable by a machine, tangibly embodying at least one program of instructions executable by the machine to perform the capabilities of an embodiment of the disclosure can be provided.

The flow diagrams depicted herein are just examples. There may be many variations to these diagrams or the elements (or operations) described therein without departing from the scope of the disclosure. For instance, the elements may be performed in a differing order, or elements may be added, deleted or modified. All of these variations are considered a part of the claimed invention.

While various embodiments of the disclosure have been described, it will be understood that those skilled in the art, both now and in the future, may make various improvements and enhancements which fall within the scope of the claims which follow. These claims should be construed to maintain suitable protection for embodiments of the It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "comprises" should be interpreted as "includes but is not limited to," etc.)

It should also be understood, that although various compounds, compositions, methods, and devices are described in "open" terms of "comprising," "including," or "having" various components or steps (interpreted as meaning "including, but not limited to"), the compounds, compositions, methods, and devices can also "consist essentially of" or "consist of" the various components and steps, and such terminology should be interpreted as defining essentially closed-member groups. This paragraph is not meant in any way to limit the meaning of "comprising", "having," or "including" (and other verb forms thereof), which are to be interpreted as open-ended phrases meaning "including but not limited to" consistent with patent law and custom. The intent of this paragraph is merely to indicate that the closed-member groups defined by the "consisting of" or "consisting essentially of" language are lesser included groups within the open-ended descriptions and to provide support for claims employing the "consisting of" or "consisting essentially of" language.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group. As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above Finally, as will be understood by one skilled in the art, a range includes each individual member. Thus, for example, a group having 1-3 substituents refers to groups having 1, 2, or 3 substituents. Similarly, a group having 1-5 substituents refers to groups having 1, 2, 3, 4, or 5 substituents, and so forth.

The flow diagrams depicted herein are just examples. There may be many variations to these diagrams or the elements (or operations) described therein without departing from the scope of the disclosure. For instance, the elements may be performed in a differing order, or elements may be added, deleted or modified. All of these variations are considered a part of the claimed invention. While various embodiments of the disclosure have been described, it will be understood that those skilled in the art, both now and in the future, may make various improvements and enhancements which fall within the scope of the claims which follow. These claims should be construed to maintain suitable protection for embodiments of the disclosure described herein.

The invention claimed is:

1. A system for consummating purchase transactions with a near field communication (NFC vending machine, the system comprising:
    a gateway computer connected to a plurality of NFC vending machines over a network;
    a plurality of computerized bezels each connected to one of the plurality of NFC vending machines, each computerized bezel comprising a processor and memory storing an interface protocol that enables a corresponding one of the plurality of NFC vending machines to accept a payment by a customer payment device, each of the plurality of computerized bezels associated with one of a plurality of different original equipment manufacturers (OEMs);
    a telemeter in data communication with each of the computerized bezels and the gateway computer; and
    a control file stored on the gateway computer and comprising a universal configuration template, the universal configuration template organizing vending parameters corresponding to a plurality of different NFC protocols and the plurality of different OEMs in a pattern of software commands, wherein the vending parameters corresponding to at least one NFC protocol of the plurality of different NFC protocols are used by the processor of each computerized bezel to complete the interface protocol, thereby enabling vending by the corresponding one of the plurality of NFC vending machines responsive to receiving the payment from the customer payment device via the at least one NFC protocol, wherein the at least one NFC protocol used by the processor of each computerized bezel is selected to correspond to an OEM of the computerized bezel based on the plurality of different OEMs associated with the universal configuration template.

2. The system of claim 1, wherein the control file further comprises a plurality of the universal configuration templates organized in sections of the control file.

3. The system of claim 2, wherein the sections of the control file correspond to sets of the plurality of NFC vending machines grouped at a plurality of installation sites.

4. The system of claim 3, wherein the interface protocol at each of the plurality of computerized bezels comprises payment software that is configured by the vending parameters stored in the NFC control file.

5. The system of claim 4, wherein the interface protocol at each of the plurality of computerized bezels comprises a data structure for storing an encryption key received from the NFC control file that enables vending payment with the customer payment device.

6. The system of claim 5, wherein the data structure of the interface protocol is configured to retrieve customer data from the customer payment device.

7. The system of claim 6, wherein the customer payment device comprises data memory on a portable card that is divided into segments and blocks for storing the customer data by data types.

8. A computer implemented method for configuring near field communications (NFC) for a first vending machine, wherein the first vending machine comprises a first computerized bezel that includes a processor and memory, the computer implemented method comprising:

establishing, over a network, by the processor of the first computerized bezel, communications with a remote computing device;

obtaining, by the processor of the first computerized bezel, from the remote computing device, parameters for a plurality of different NFC protocols associated with a plurality of different original equipment manufacturers (OEMs) of computerized bezels including an OEM of the first computerized bezel, wherein the parameters are organized in a pattern of software commands in a universal configuration template, the universal configuration template maintained on the remote computing device;

extracting, by the processor of the first computerized bezel, a subset of the parameters associated with at least one NFC protocol of the plurality of different NFC protocols based on the OEM of the first computerized bezel; and activating, by the processor of the first computerized bezel, an interface protocol based on the subset of the parameters, wherein activating the interface protocol enables the processor of the first computerized bezel to wirelessly receive a payment from a customer payment device that utilizes the at least one NFC protocol, wherein receiving the payment from the customer payment device cause the first vending machine to dispense a product.

9. The computer implemented method of claim 8, wherein the communications between the processor of the first computerized bezel and the remote computing device over the network are facilitated by an intermediary telemetry device.

10. The computer implemented method of claim 8, wherein the universal configuration template is one of a plurality of universal configuration templates organized in sections on the remote computing device.

11. The computer implemented method of claim 10, wherein the sections correspond to vending equipment grouped at a plurality of installation sites.

12. The computer implemented method of claim 8, wherein the interface protocol of the first computerized bezel comprises payment software that is configured by the subset of the parameters that are extracted.

13. The computer implemented method of claim 8, wherein the interface protocol of the first computerized bezel comprises a data structure for storing an encryption key received from the remote computing device, the encryption key enabling vending payment with the customer payment device.

14. The computer implemented method of claim 8, wherein a data structure of the interface protocol is configured to retrieve customer data from the customer payment device.

15. The computer implemented method of claim 14, wherein the customer payment device comprises data memory on a portable card that is divided into segments and blocks for storing the customer data by data types.

* * * * *